(12) United States Patent
Belhadj et al.

(10) Patent No.: US 7,782,805 B1
(45) Date of Patent: Aug. 24, 2010

(54) HIGH SPEED PACKET INTERFACE AND METHOD

(76) Inventors: Med Belhadj, 30 Kings Landing, Ottawa, Ontario (CA) K1S 5P8; Jason Alexander Jones, 787 Green St., East Palo Alto, CA (US) 94303; Ryan Patrick Donohue, 271 Sierra Vista #3, Mountain View, CA (US) 94043; James Brian McKeon, 1391 Ridgeley Dr., Campbell, CA (US) 95008; Fredrick Karl Olive Olsson, 1115 St. Joseph Ave., Los Altos, CA (US) 94024; Sebastian H. Ziesler, 200 Loma Alta Ave., Los Gatos, CA (US) 95030; Mark Andrew Gustlin, 1257 Cobblestone Dr., Campbell, CA (US) 95008; Oded Trainin, Ben-Guriun St. 8, Raanana (IL); Yiren Huang, 1160 Eagle Cliff Ct., San Jose, CA (US) 95120; Raymond Kloth, 12649 Arroyo de Arguello, Saratoga, CA (US) 95070; Rami Zecharia, Hayasmin 14 (P.O. Box 66), Moshav Adanim (IL) 45925

( * ) Notice: Subject to any disclaimer, the term of this patent is extended or adjusted under 35 U.S.C. 154(b) by 976 days.

(21) Appl. No.: 11/349,212

(22) Filed: Feb. 8, 2006

Related U.S. Application Data

(60) Provisional application No. 60/650,511, filed on Feb. 8, 2005, provisional application No. 60/680,011, filed on May 12, 2005.

(51) Int. Cl.
H04L 5/22 (2006.01)

(52) U.S. Cl. .................. 370/300; 370/473; 370/476; 370/470; 370/429

(58) Field of Classification Search ......... 370/229–240, 370/471, 474, 476, 907, 536, 470, 100.1
See application file for complete search history.

(56) References Cited

U.S. PATENT DOCUMENTS 5,150,247 A * 9/1992 Sharpe et al. .................. 398/98

(Continued)

OTHER PUBLICATIONS

Cam, Richard et al., "System Packet Interface Level 4 (SPI-4) Phase 2 Revision 1: 0C-192 System Interface for Physical and Link Layer Devices", OIF-SPI-4-02.1, Optical Internetworking Forum (OIF), Oct. 15, 2003.

(Continued)

*Primary Examiner*—Huy D Vu
*Assistant Examiner*—Zewdu Beyen

(57) ABSTRACT

A high speed multi-lane serial interface and method for constructing frames for such an interface are provided. Frames are constructed for transmission on a multi-lane serial interface. For each of a plurality of transmit channels, packets are fragmented into fragments. Meta-frames are generated having a size defined by a constant meta-frame length×number of lanes, each frame having a meta-frame separator and a payload. Per-transmit channel flow control information is received. Each payload has a plurality of bursts, each burst comprising a burst control word and an associated data burst, the burst control word identifying one of said transmit channels to be transmitted on the associated data burst, each data burst comprising one of the fragments for the transmit channel identified in the associated burst control word. The channels to transmit in a given meta-frame are selected as a function of the received flow control information.

50 Claims, 22 Drawing Sheets

U.S. PATENT DOCUMENTS

| | | |
|---|---|---|
| 6,498,794 B1 * | 12/2002 | Tsukamoto et al. ...... 370/395.1 |
| 6,594,262 B1 * | 7/2003 | Kwon et al. ............. 370/395.1 |
| 6,700,900 B1 * | 3/2004 | Turban ....................... 370/465 |
| 6,718,491 B1 * | 4/2004 | Walker et al. ............... 714/701 |
| 6,907,044 B1 * | 6/2005 | Yonge et al. ................ 370/445 |
| 6,931,009 B1 * | 8/2005 | Agarwal .................. 370/395.1 |
| 7,031,343 B1 * | 4/2006 | Kuo et al. .................... 370/473 |
| 2004/0008794 A1 * | 1/2004 | McClellan .................. 375/260 |
| 2004/0052528 A1 * | 3/2004 | Halgren et al. ................ 398/75 |
| 2004/0081081 A1 * | 4/2004 | Colombo .................... 370/216 |
| 2004/0196847 A1 * | 10/2004 | Kuwabara ................... 370/393 |
| 2006/0165099 A1 * | 7/2006 | Doherty et al. ............. 370/397 |

OTHER PUBLICATIONS

U.S. Appl. No. 11/263,609, filed Oct. 31, 2005, Huang, Yiren R. et al.

* cited by examiner

HIGH SPEED PACKET INTERFACE AND METHOD

RELATED APPLICATIONS

This application claims the benefit of U.S. provisional application No. 60/650,511 filed Feb. 8, 2005 and U.S. provisional application No. 60/680,011 filed May 12, 2005 both of which are hereby incorporated by reference in their entirety.

FIELD OF THE INVENTION

The invention relates to packet interfaces and methods.

BACKGROUND OF THE INVENTION

Packet interfaces are usually implemented based on either a parallel interface (e.g. OIF SPI4.2 interface 16 bit at 622 to 800 Mbps), or serial interfaces (e.g. XAUI 4 lane at 3.125 Gbps). An overview of the XAUI interface vs. the SPI4.2 interface is shown in FIG. 1, with the XAUI interface generally indicated at 10, and the SPI4.2 interface generally indicated at 12.

SPI4.2 is a wide (16 signal bits in both receive and transmit), source-synchronous (a clock signal is supplied by the transmitter) parallel interface that provides up to 256 channels of communication and independent flow control for each channel.

While SPI4.2 offer many advantages (channelization, programmable burst size, per-channel back-pressures, etc), it is a very wide interface (more than 80 I/Os). SPI4.2 suffers also from a reach limitation. In particular, it is difficult to implement longer than about a dozen inches.

XAUI is a narrow (4 signal bits in both receive and transmit) interface based on serializer-deserializer (serdes) technology that lacks any concept of channels. Serdes-based interfaces are capable of longer range than source-synchronous parallel interfaces, and can be routed across board interconnects and system backplanes.

Referring again to FIG. 1, the XAUI interface includes XAUI analog functionality generally indicated at 14 consisting of XAUI TX and XAUI RX, and the XGXS sub-layer function 16 which converts between packets in the XGMII protocol and the four lane format required by the XAUI TX and XAUI RX 14. The XGXS sub-layer defines the system-side data interface, jitter testing operations, lane deskew.

The XAUI Interface generates four channels of serial data (differential) at 3.125 Gbps per channel. The reverse applies in the receive direction. The XGMII interface is as defined in the IEEE Draft P802.3ae Clause 46. The XGXS and XAUI functions are as defined in the IEEE 802.3ae Clause 47, Clause 48 and Annex 48A.

The XGMII protocol defines an 8 byte preamble for Ethernet Frames (consisting of one start character, six preamble bytes and one start of frame delimiter—FB 55 55 55 55 55 55 D5), a minimum of 64 and a maximum of 1518 payload data bytes (including CRC), one end of frame delimiter (FD) followed by a minimum of 12 interframe idle characters (07). Referring now to FIG. 2, this information is formatted into four 8 bit lanes 24. There is also one control character 26 per lane as shown in FIG. 2.

The control character is a 4 bit value determined by the XGMII coding. For example an Idle character /I/ has a control value of '1'. Each bit corresponds to a lane: i.e. bit 0 indicates whether lane zero is a control character or a data character, bit 1 indicates this for lane 1, and so on.

Referring again to FIG. 1, in the transmit direction, the XGXS 16 takes XGMII format data and control which is then encoded using the standard 8 bit to 10 bit encoding scheme (8b/10b). The result is serialized into four data streams 20 at 3.125 Gbps. A number of test patterns can be selected as encoded data for testing purposes.

In the receive direction, four data streams 22 at 3.125 Gbps have the clock and data recovered and converted to four streams of 10 bit parallel data. These are word and lane aligned followed by decoding using the reverse of the 8b/10b scheme. Verifiers can verify the received test patterns for testing purposes.

SUMMARY OF THE INVENTION

According to one broad aspect, the invention provides a method of constructing frames for transmission on a multi-lane serial interface, the method comprising: for each of a plurality of transmit channels, fragmenting packets into fragments; generating meta-frames having a size defined by a constant meta-frame length×number of lanes, each frame having a meta-frame separator and a payload; receiving per-transmit channel flow control information; wherein each payload comprises a plurality of bursts, each burst comprising a burst control word and an associated data burst, the burst control word identifying one of said transmit channels to be transmitted on the associated data burst, each data burst comprising one of the fragments for the transmit channel identified in the associated burst control word, the channels to transmit in a given meta-frame being selected as a function of the received flow control information.

In some embodiments, the flow control information is included in-band within the payload of the meta-frames.

In some embodiments, the flow control information comprises flow control words distributed in predetermined locations along the frame length.

In some embodiments, the flow control words are distributed uniformly.

In some embodiments, each meta-frame further comprises a preamble having a start character, and the payload is followed by a terminate character, and wherein the payload has a size selected such that the start character and the end character always map to a predetermined lane.

In some embodiments, the bursts have a fixed burst size except a last burst for each packet which may be different so as to accommodate the packet having a size not equaling an integer multiple of the fixed burst size.

In some embodiments, the bursts all have a fixed burst size with idle words inserted if necessary in a last burst for a given packet.

In some embodiments, each flow control word comprises one byte for each lane in each of the predetermined locations along the frame length.

In some embodiments, each flow control word comprises a framing pattern, channel status for a plurality of channels and parity checks.

In some embodiments, the method further comprises: inserting in the payload of some frames a further control word that is distinct from the burst control word; wherein each control word including the further control words and the burst control words has an associated type, one of the types being burst control word type.

In some embodiments, the multi-lane serial interface is a XAUI interface.

In some embodiments, the frames are substantially compliant with the XGMII format.

In some embodiments, the method further comprises: transmitting the frames over the multi-lane serial interface.

In some embodiments, the flow control words are inserted at a defined frequency that is a configurable parameter such that a smaller frequency can be employed for a smaller number of channels, and a larger frequency can be employed for a larger number of channels.

In some embodiments, the method further comprises: receiving meta-frames from a transmitter, the received meta-frames having a size defined by the constant meta-frame length×number of lanes, each frame having a meta-frame separator and a receive payload; wherein each receive payload comprises a plurality of bursts, each burst comprising a burst control word and an associated data burst, the burst control word identifying one of a plurality of receive channels to be received on the associated data burst, each data burst comprising a fragment of a packet for the receive channel identified in the associated burst control word; transmitting per-receive channel flow control information in respect of the channels from a of the meta-frames.

In some embodiments, the method further comprises: mapping each burst to the multiple lanes in sequence N bytes at a time, where N≧1.

In some embodiments, the method where N=8.

In some embodiments, each set of N=8 bytes are mapped to a 66 bit codeword using a 64b/66b encoder, with two bits indicating each 8 bytes to be either a data burst or a control burst.

In some embodiments, each set of N=8 bytes are mapped to a 67 bit codeword using a 64b/67b encoder, with two bits indicating each 8 bytes to be either a data burst or a control burst, and one bit indicating whether bits of the 64b/67b codeword have been inverted.

In some embodiments, the method further comprises: for each lane, maintaining a disparity count reflecting a disparity between how many "1"s have been transmitted vs. how many "0"s have been transmitted; for a current 64b/67b codeword, inverting bits of the codeword or not as a function of the disparity count.

In some embodiments, inverting comprises inverting all bits of each codeword except the two bits indicating control burst/data burst and the one bit indicating whether bits have been inverted.

In some embodiments, receiving flow control information comprises receiving flow control information in each burst control word.

In some embodiments, receiving flow control information comprises receiving the flow control information on an additional separate lane or on an additional interface.

In some embodiments, receiving flow control information comprises receiving 2 bits of flow control for each of a plurality of channels, with flow control information being included for all channels in one or multiple burst control words.

In some embodiments, the 2 bits of flow control information are consistent with SPI4.2 flow control definitions.

In some embodiments, the 2 bits of flow control information are consistent with SPI4.2 flow control definitions with an exception of SATISFIED status which is redefined to indicate that all current credits are cancelled.

In some embodiments, receiving flow control information comprises receiving a single on/off bit of flow control for each of a plurality of channels.

In some embodiments, the method further comprises receiving in each burst control word an indication of whether or not to restart flow control at the first channel.

In some embodiments, the method further comprises: mapping each burst to the multiple lanes in sequence N bytes at a time, where N≧1.

In some embodiments, the method further comprises: mapping each burst to the multiple lanes in sequence N bytes at a time, where N=8.

In some embodiments, transmitting flow control information comprises transmitting the flow control information on an additional separate lane or on an additional interface.

In some embodiments, transmitting flow control information comprises transmitting 2 bits of flow control for each of a plurality of channels, with flow control information being included for all channels in one or multiple burst control words.

In some embodiments, transmitting flow control information comprises transmitting a single on/off bit of flow control for each of a plurality of channels.

In some embodiments, the method further comprises including in each burst control word an SOP (start of packet) bit, and EOP (end of packet) bit, and an ERR bit, the SOP and EOP bits indicating whether the following data burst is a start of packet and/or end of packet, and the ERR bit indicating whether there is an error.

In some embodiments, the method further comprises including in each burst control word an SOP (start of packet) bit, and a four bit EOP_Format field encoded as follows: '1xxx'—End-of-Packet, with bits xxx defining a number of valid bytes in the last 8-byte word in the burst; '0000'—no End-of-Packet, no ERR; '0001'—Error and End-of-Packet; all other combinations undefined.

In some embodiments, the method further comprises: including in each burst control word a CRC over a preceding data burst, and an error correction code over the burst control word.

In some embodiments, the method further comprises including in each burst control word a CRC over a preceding data burst, and a defined set of bits of the burst control word.

In some embodiments, the meta-frame separator comprises at least two consecutive control words.

In some embodiments, the at least two consecutive control words comprise at least a diagnostic word and an alignment control word.

In some embodiments, the at least two consecutive control words comprise a diagnostic word and an alignment control word, with at least some frames further containing one or more skip control words.

In some embodiments, the bursts have a fixed burst size except a last burst for each packet which may be smaller so as to accommodate the packet having a size not equaling an integer multiple of the fixed burst size.

In some embodiments, fragmenting packets into fragments is done subject to a burst short size and a burst maximum size for data bursts, with idle words being inserted in last burst for a packet if the last fragment does not result in the burst short size.

In some embodiments, fragmenting packets into fragments comprises fragmenting in a manner that avoids bursts being smaller than a burst minimum size without the need to insert idles.

In some embodiments, fragmenting packets into fragments comprises: fragmenting into fragments equal to a maximum size, and a last fragment containing a remainder; if the last fragment will be smaller than the burst short size, moving part of a preceding fragment into the last fragment such that they are both larger than the burst minimum size.

In some embodiments, a method of implementing a repeater function comprises: receiving frames generated using the method as summarized above; removing one or more skip words to perform clock compensation; moving one or more payload words of a succeeding meta-frame into a preceding meta-frame in order to maintain a constant distance between synchronization words notwithstanding the removal of the one or more skip words; transmitting the modified meta-frames.

In some embodiments, a method of implementing a repeater function comprises: receiving frames generated using the method as summarized above; adding one or more skip words to perform clock compensation; moving one or more payload words of a preceding meta-frame into a succeeding meta-frame in order to maintain a constant distance between synchronization words notwithstanding the addition of the one or more skip words; transmitting the modified meta-frames.

In some embodiments, the method further comprises: performing the mapping of packets to lanes to fewer lanes in the presence of a lane failure.

In some embodiments, the method further comprises: performing lane alignment for receive channels by looking for a synchronization word in consistently spaced locations in the received meta-frames.

In some embodiments, the method further comprises: scrambling by XORing 64 bits of each 64b/67b codeword on each meta-frame lane with a current state of a scrambler; performing scrambler reset and synchronization using a synchronization word in each meta-frame separator.

In some embodiments, the method further comprises transmitting idle control bursts when there is no data to send.

In some embodiments, the method further comprises inserting a random channel number into each idle control burst to avoid false synchronization.

In some embodiments, the method further comprises: performing word synchronization for receive channels by looking for valid data burst/control burst indicator bit combinations in consistently spaced locations.

In some embodiments, the method further comprises: performing word synchronization for receive channels by looking for valid three bit patterns for the two bits indicating each 8 bytes to be either a data burst or a control burst and the one bit indicating whether bits of the codeword have been inverted in consistently spaced locations.

In some embodiments, an interface provided that is adapted to implement any of the methods summarized above. In some embodiments, an integrated circuit is adapted to implement any of the methods summarized above. Such circuits and interfaces can be designed as one end of a simplex implementation, one end of a full-duplex implementation, or a combination of circuits and interfaces that implement both ends of a simplex or full-duplex implementation.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

XAUI was not designed as a channelized chip-to-chip interface, and thus lacks important features like channelization, back-pressure (flow control), etc. XAUI was designed to connect a PHY (physical layer interface) to a MAC (medium access controller), and thus only has one channel.

Embodiments of the invention provide an interface and method referred to herein as High Speed Packet Interface (HSPI), that enables XAUI and similar multi-lane high-speed serial interfaces to support multi-channel packet interface.

Figure 3A:
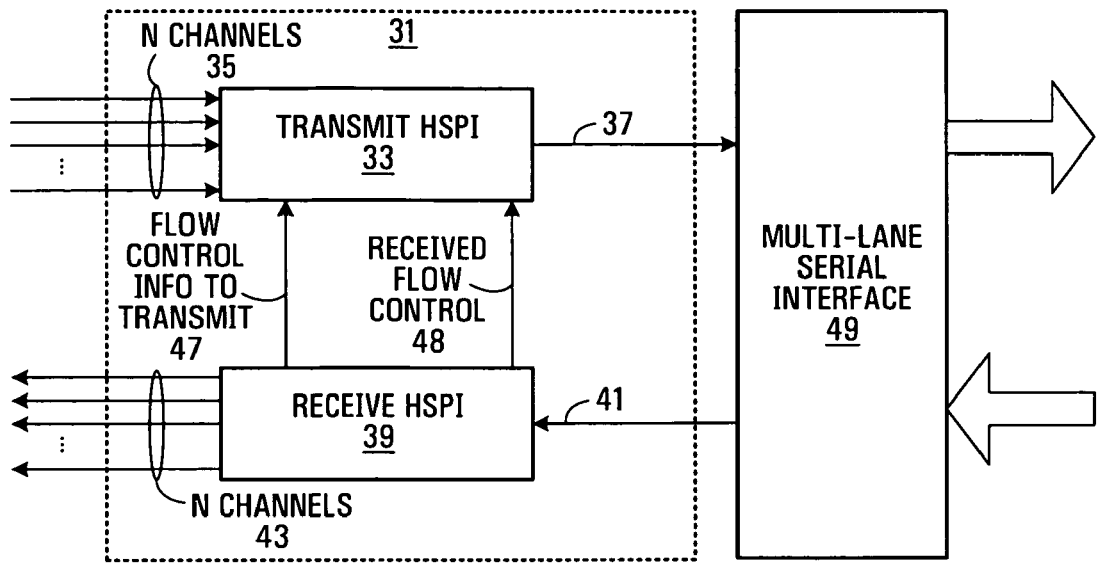
FIG. 3A is a block diagram of a high-speed interface provided by an embodiment of the invention.

Referring now to FIG. 3A, shown is a block diagram of a high-speed interface generally indicated by 31 provided by an embodiment of the invention. Shown is a transmit HSPI 33 that has a plurality N of input channels 35 and produces frames 37. Also shown is a receive HSPI 39 that receives frames 41 and produces a plurality N of output channels 43. As detailed below, the receive HSPI 39 extracts data from the received frames 41 and produces output at the output channels 43. It also extracts received flow control information and forwards this as indicated at 48 to the transmit HSPI 33. The transmit HSPI 33 uses the received flow control information 48 in the process of generating the data frames 37 from the inputs 35. Another input to the transmit HSPI 33 consists of flow control information to transmit 47. The transmit HSPI 33 sends this flow control information across the interface for use in performing flow control of transmissions generated at the other end of the link. The HSPI is shown connected to a multi-lane serial interface 49. The frames 37,41 are in a format processable by the multi-lane serial interface 49.

The frames 37,41 are of fixed, optionally configurable, size notwithstanding the fact that the multi-layer serial interface may accommodate variable frame size. The frame delimiters are included in the frames 37,41 in fixed predetermined lane locations to simplify processing. In some embodiments, the flow control information is embedded within the frames periodically in predetermined locations, i.e. "in-band" flow control. In other embodiments, out-of-band flow control is employed.

While the HSPI 31 and the multi-lane serial interface 49 are shown as separate components, typically this functionality would be implemented as part of a single chip. A complete interface includes both the HSPI 31 and the multi-lane serial interface 49.

A particular layout of functionality is depicted in FIG. 3A. However, it is to be understood this is for the purpose of example only. For example, while a connection 48 for flow control information is shown, this information can be conveyed from receive HSPI to transmit HSPI in any appropriate manner that does not even necessarily involve physical transmission of the information: for example the information could be written to a memory location and then read from the location. Similarly, while packets are "received" on the N channels 35, this represents any appropriate mechanism of obtaining a packet to process. The HSPI can be implemented in hardware either as a standalone chip, a chip also containing the multi-lane serial interface, or as part of a chip that includes other functionality as well. However, firmware and software implementations are also contemplated.

Any suitable encoding scheme can be used by the multi-lane serial interface. Specific examples include the 8b/10b encoding scheme, 64b/66b and the 64b/65b encoding schemes. Also, serial interfaces can be run at any appropriate speed. Specific examples include 3.125 Gbps and 6.25 Gbps (per lane). A new 64b/67b scheme is also provided.

Figure 3B:
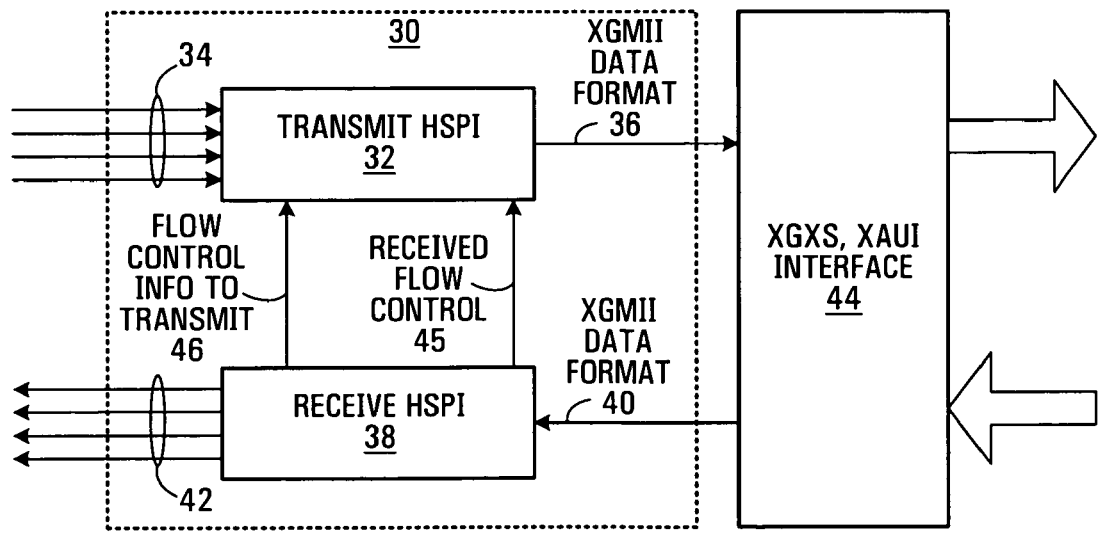
FIG. 3B is a block diagram of a high-speed interface provided by an embodiment of the invention.

A specific implementation is shown in FIG. 3B, which shows a block diagram of a high-speed interface generally indicated at 30, provided by another embodiment of the invention. Shown is a transmit HSPI 32 that has a plurality of input channels 34 (four shown in the illustrated example) and produces an output 36 consisting of frames having the XGMII data format. Also shown in a receive HSPI 38 that receives frames 40 having the XGMII data format and produces a plurality of output channels 42, four shown in the illustrated example. As detailed below, the receive HSPI 38 extracts data from the received frames 40 and produces output at the output channels 42. It also recovers received flow control information and forwards this as indicated at 45 to the transmit HSPI 32. The transmit HSPI 32 uses the received flow control information 45 in the process of generating the data frames 36 from the inputs 34. Another input to the transmit HSPI 32 consists of flow control information to transmit 46. The transmit HSPI 32 sends this flow control information over the interface for use in performing flow control of transmissions generated at the other end of the link. The HSPI is shown connected to XAUI interface 44. In some embodiments, the XAUI interface 44 is implemented in a completely conventional manner. This is highly beneficial because the XAUI interface is well established, and there are many test procedures for verifying the interface that can therefore be re-used.

While the example of FIG. 3B shows four input channels and four output channels, more generally, an arbitrary number of input and output channels can be employed. Furthermore, while in the some embodiments the output of the high-speed interface 30 is in the XGMII data format, and the input is in the XGMII data format, more generally, other serialized data formats may be employed.

Figure 4:
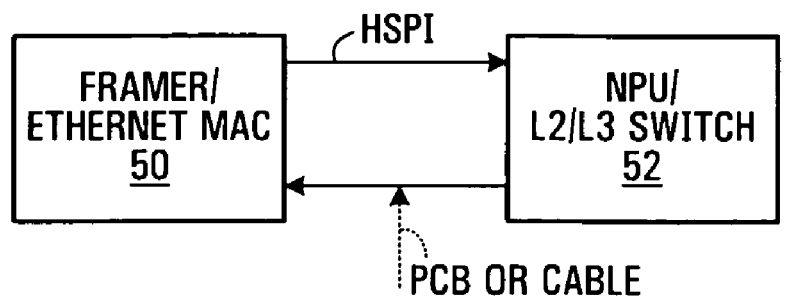
FIG. 4 shows a first example context for using the high-speed interface of FIG. 3.
Figure 5:
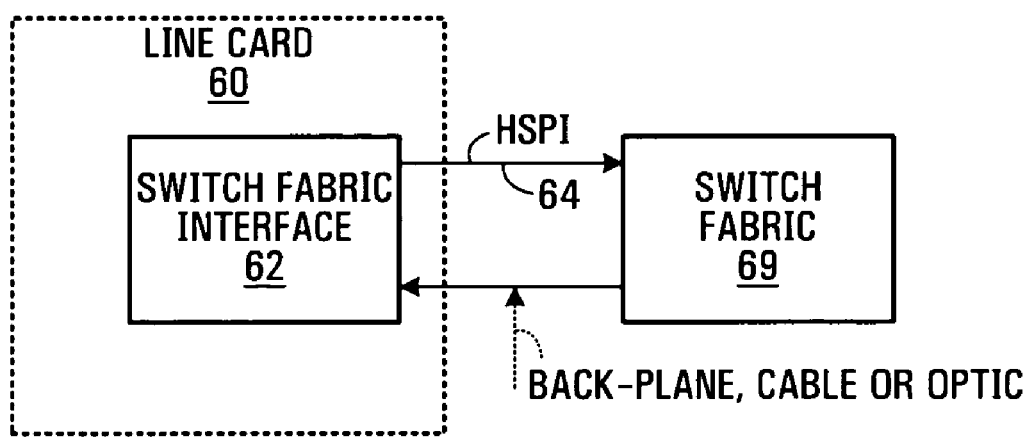
FIG. 5 shows a second example context for using the high-speed interface of FIG. 3.

Furthermore, while the HSPI 30 and the XAUI interface 44 are shown as separate components, typically this functionality would be implemented as part of a single chip. In one example application of the new HSPI, shown in FIG. 4, a framer/Ethernet MAC 50 is shown communicating with an NPU/L2/L3 switch 52 using the HSPI. Thus, these components would have built in the HSPI functionality 30 and the XAUI interface 44 shown in FIG. 3B. The HSPI interface can be run over multiple media types such as FR4 (PCB), cable or optical. In another example application, shown in FIG. 5, a line card 60 is shown with a switch fabric interface 62 that communicates with a switch fabric 64 using the HSPI. Once again, the interface chips employed would have the HSPI functionality 30 and the XAUI interface 44 of FIG. 3B.

In some embodiments, each lane will transmit at a raw frequency of 3.125 Gbps, although the actual speed of the transmission does not affect the operation of the interface as long as all four lanes can be kept byte-synchronous.

Further details of an example implementation will be described in the context of employing XGMII format frames over an XAUI interface, as shown in FIG. 3B. This includes details of an example data encoding scheme; detailed flow control scheme; and particular frame format. It is to be understood that embodiments employing the XGMII format over XAUI are not limited to these particular examples. Furthermore, it is to be clearly understood that the same concepts are applicable to the more generic view shown in FIG. 3A that does not necessarily employ the XGMII format.

Figure 6:
FIG. 6 is a high level view of the meta-frame format.

Referring now to FIG. 6, shown is a new meta-frame format that is generated by the transmit HSPI 32 on the transmit side, and that is processed by the receive HSPI 38. The frame format is substantially consistent with the XGMII data format.

The meta-frame 60 is of fixed duration, and consists of a preamble 62, a payload 64, and a meta-frame separator (MFS) 66. Advantageously, the meta-frame includes idles to compensate for clock differences, for example +/−100 ppm, and a fixed size is used to avoid wasting bandwidth due to idles and preamble (packet size dependency).

Figure 7:
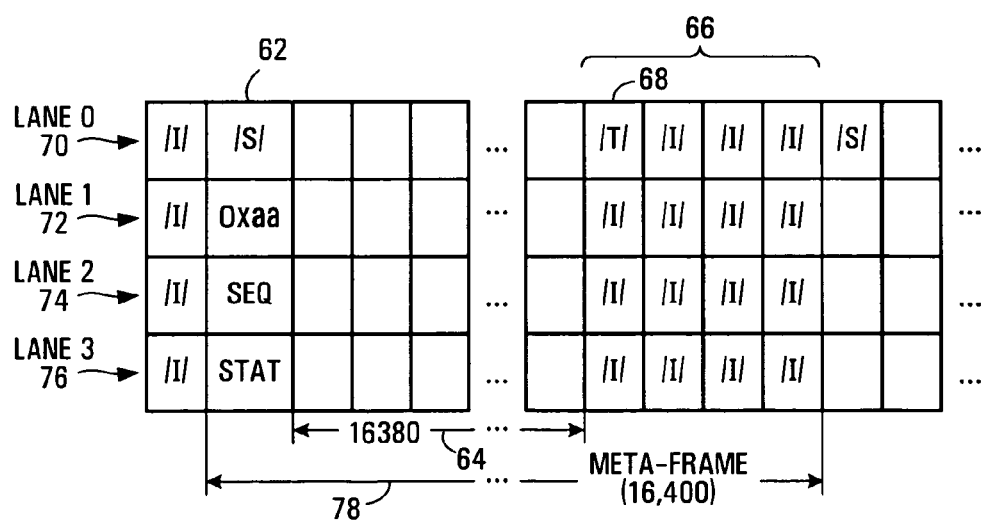
FIG. 7 is a more detailed view of the meta-frame format showing the preamble and trailer structures.

How the meta-frame maps to a four lane data format is shown in FIG. 7. The four lanes are indicated at 70, 72, 74, 76. A single meta-frame is indicated at 78. This consists of the preamble 62, payload 64 and trailer 68 and meta-frame separator 66.

In this example, the preamble 62 consists of four bytes including the start character /S/ followed by 0xaa which indicates channelized XAUI protocol SSPI, SEQ which indicates a frame sequence number, and STAT which is a status word. In this case, the payload is 16380 bytes. The fixed size of the meta-frame can be a configurable parameter. This is followed by the terminate character /T/ 68 and the meta-frame separator 66 consisting of /I/ characters. The particular size of the payload is can be selected to ensure that the terminate character will always be located in a predetermined lane, for example lane 0. This simplifies processing at the receiver as it only needs to look in lane 0 for the terminate character.

Figure 1:
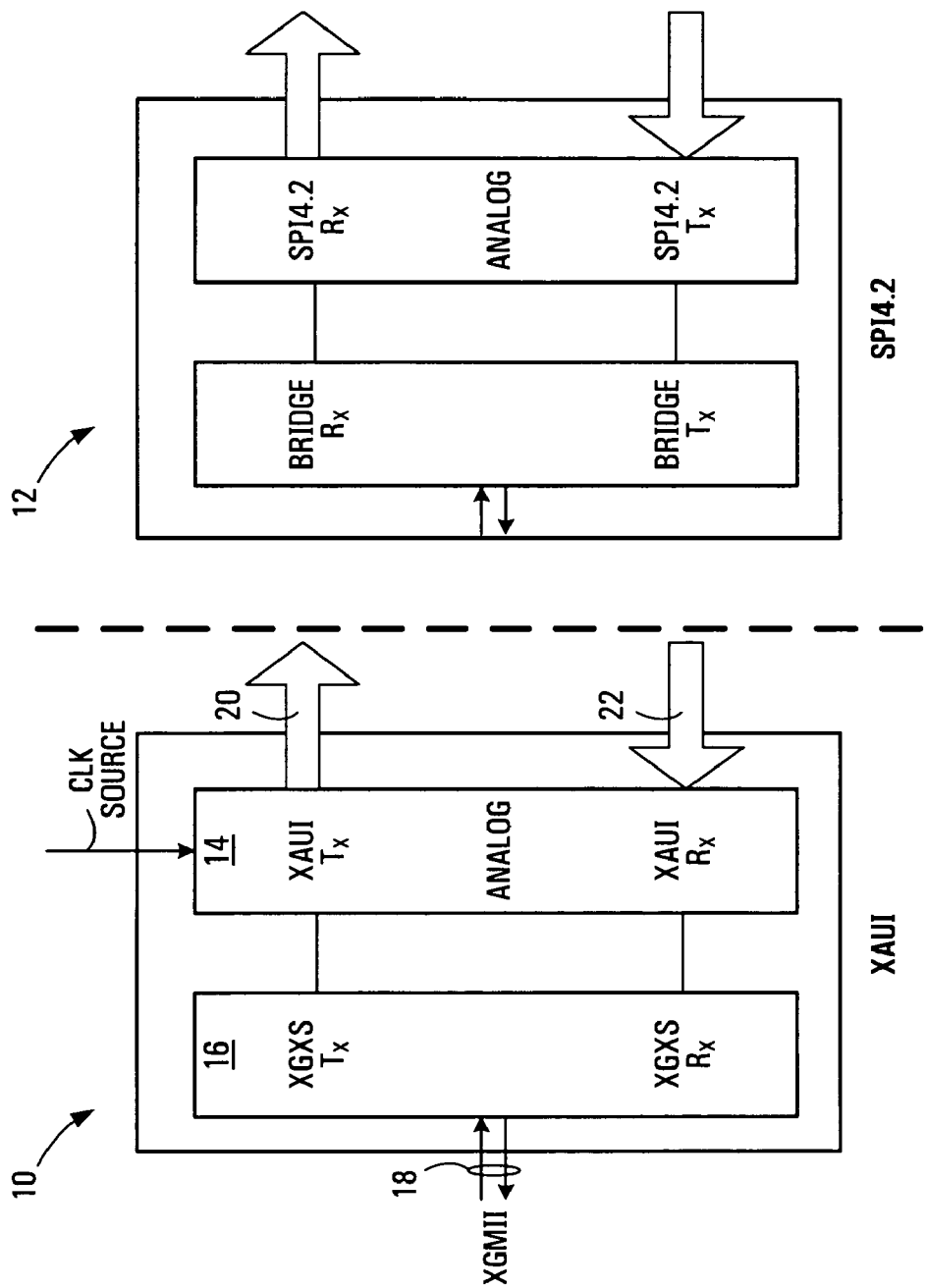
FIG. 1 is a block diagram showing the XAUI interface and the SPI4.2 interface.
Figure 2:
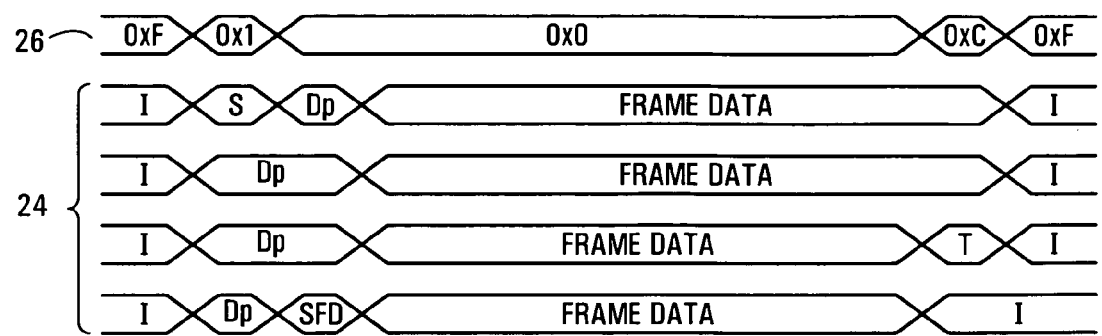
FIG. 2 shows the XGMII data format.

The example frame format has a 4 byte preamble rather than the 8 byte preamble for the XGMII format of FIG. 2. The 8 byte preamble was designed specifically for Ethernet. The XGXS mandates that there is start character, finish character and a minimum of 12 /I/ characters. As such, the meta-frame format shown in FIG. 7 is compliant with the XGXS mandate and substantially compliant with XGMII. However, it is contemplated that other preamble and meta-frame separator structures can alternatively be employed. However, in some implementations the start and terminate characters are always in a known lane such as lane 0 in the illustrated example.

In the example of FIG. 7, the control vs. data distinction is embedded in the information and the multi-lane service interface processes this accordingly. Alternatively, an additional control channel can be employed similar to or identical to the XGMII control channel discussed with reference to FIG. 2 in which there is a control bit per lane.

Figure 8:
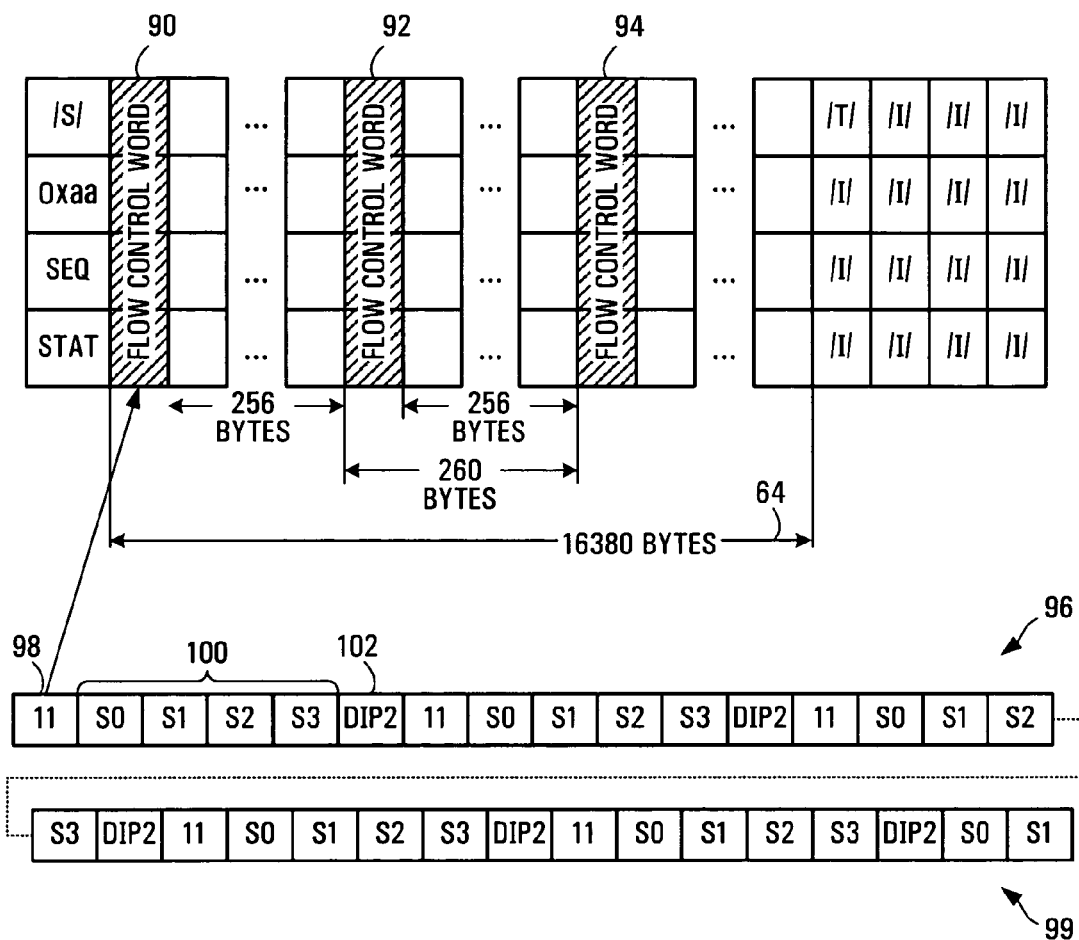
FIG. 8 shows the meta-frame format with flow control word insertion.

To provide flow control, a flow control word is periodically inserted in the payload portion of the meta-frame. In some embodiments, each flow control word consists of four bytes, one byte per lane. An example of this is shown in FIG. 8 where the payload 64 is shown to include flow control words 90, 92, . . . , 94. In some embodiments, the frequency of the flow control word can be set for a given implementation. This might for example be a programmable value. Advantageously, for a smaller number of channels, the frequency of the flow control word can be reduced thereby improving the bandwidth efficiency compared to what would be the case if a worst case frequency of the flow control word were used that accommodates the maximum number of channels.

In the illustrated example, one flow control word is included within each 260 bytes of the payload.

In some embodiments, the flow control channel contains the same information as the TSTAT bus defined in SPI4.2:

A framing pattern consisting of the bits "11";

Two bits of channel status per channel;

Parity check bits (DIP2).

An example of a sequence of two flow control words employing such a pattern is shown in FIG. 8 at 96 and 99 for a four channel implementation. In the first flow control word 96 the framing pattern is indicated at 98, channel status for four channels at 100, and the parity checks at 102. This repeats until the entire 32 bits of the flow control word are filled. In the next flow control word 99, the pattern simply continues with the flow control word starting with the next channel status in the pattern.

For this example, the status of all four channels is given repeatedly in one flow control word. However, for larger numbers of channels, multiple flow control words may need to convey a single status for each channel. Thus, in the illustrated example, a single flow control word can include a channel status for 14 channels.

The result is a flow control channel that is both regular because of the fixed periodic insertion, and flexible because the frequency of insertion can be adapted for a given application so as not to penalize implementations with a smaller number of channels.

In another embodiment, the flow control channel is inserted in predetermined locations that may or may not be uniformly distributed. In some embodiments, the number of insertions is configurable to provide flexibility.

Any appropriate flow control mechanism is contemplated. In a very specific example, each receiver maintains two "credit amounts" MaxBurst1, MaxBurst2 for each channel. A two bit channel status flow control information can be used to indicate:

"00" use what is left in term of credit and stop transmitting any further data in that channel;

"01" send up to MaxBurst1 on this channel;

"10" send up to MaxBurst2 on this channel.

Upon receipt of this flow control information, the HSPI can use the information to decide which information (i.e. a fragment from which channel) to send next.

The above describes how received flow control information is used to influence what is transmitted. A complementary process is used to decide what flow control information to transmit to the other end of the link on the basis of received data fragments and receive buffer capacity. The receiver has a FIFO buffer (physical or logical) for each channel in which packets are reconstructed from received fragments. Two "water marks or thresholds": th1 & th2 can be defined. The flow control information for each channel can be determined according to:

If the FIFO is filled between 0<amount<th1 then send "10";

if the FIFO is filled th1<amount<th2 then send 01;

otherwise send 00.

In the illustrated example, the first flow control word is inserted immediately after the preamble and then they are periodically inserted after that. More generally, they can be inserted in any periodic fashion within the payload portion.

Returning now to FIG. 3B, packets arriving at the input channels 34 are fragmented by the transmit HSPI 32. The fragments are inserted into meta-frames which are then output in the XGMII format at 36. Advantageously, fragmenting the received packet means that all of the channels can be served on an ongoing basis, and avoids the need to perform the store and forward operation that would be necessary were entire packets on each input channel to be transmitted in sequence. Each data packet is split into a sequence of bursts. Each burst is a fragment of data that is less than or equal to a defined burst size, for example 256 bytes. In some embodiments, the burst size is a programmable value. In some embodiments, complete bursts are used for a given packet until the end of the packet where if there are any bytes left over, the last burst can be shorter than the burst length. For example, for a defined burst size of 256, a packet of 514 bytes would be split into two bursts of 256 bytes and one burst two bytes.

Each burst has an associated burst control word that is inserted into the payload portion of the meta-frame preceding the actual data burst. In an example implementation, the burst control word consists of:

TYP[1:0]: control type.

Channel[12:0] channel number.

BL[7:0]: Burst length in unit of Bytes.

SOP: Start Of Packet, the following burst is the first burst of the packet.

EOP: End Of Packet, the following burst is the last burst of the packet.

ERR: Only valid if EOP is set (last Burst), indicates if set that the packet is errored.

CRC4[3:0]: over Data Burst.

DIP2[1:0]: over control word.

A mechanism is also provided to allow the insertion of control words. In some implementations, in addition to the burst control word defined above, other control words can also be inserted following a data burst.

In some embodiments, the first two bits of a burst define the type of the burst to be either a data burst or a control word. The table below defines an example of this.

| TYP[1:0] | Definition |
|---|---|
| 00 | Reserved |
| 01 | Data Burst |
| 10 | Control Word |
| 11 | Reserved |

Figure 9:
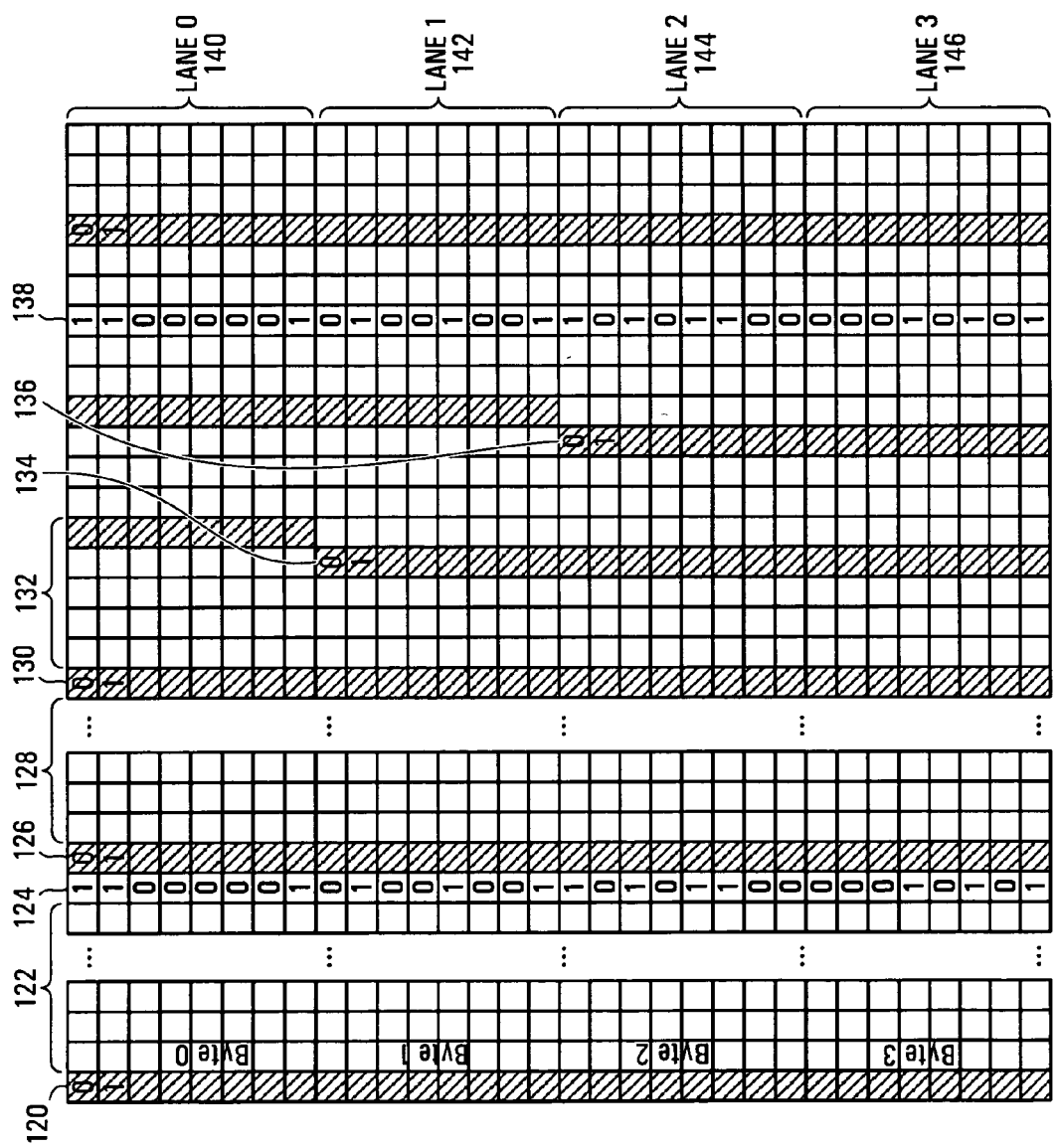
FIG. 9 shows a detailed example of data burst encoding.

Referring now to FIG. 9, shown is an example of a portion of an encoded payload. In FIG. 9, the encoding scheme shows vertical columns of 32 bits that map onto the four lanes. Time is running from left to right. Lane 0 is indicated at 140, lane 1 at 142, lane 2 at 144, and lane 3 at 146. A burst control word is indicated at 120 followed by the data burst 122. This is followed by a flow control word 124 which is in turn followed by another burst control word 126 and another data portion 128. For the bursts shown thus far, the burst control word has always started in lane 0. The following burst control word 130 has a burst 132 that has its last byte in lane 0. Thus, the burst control word for the next burst begins in lane 1 as indicated at 134. The next burst control word is inserted at 136. The burst following burst control word 136 is interrupted by the flow control word 138.

Figure 10:
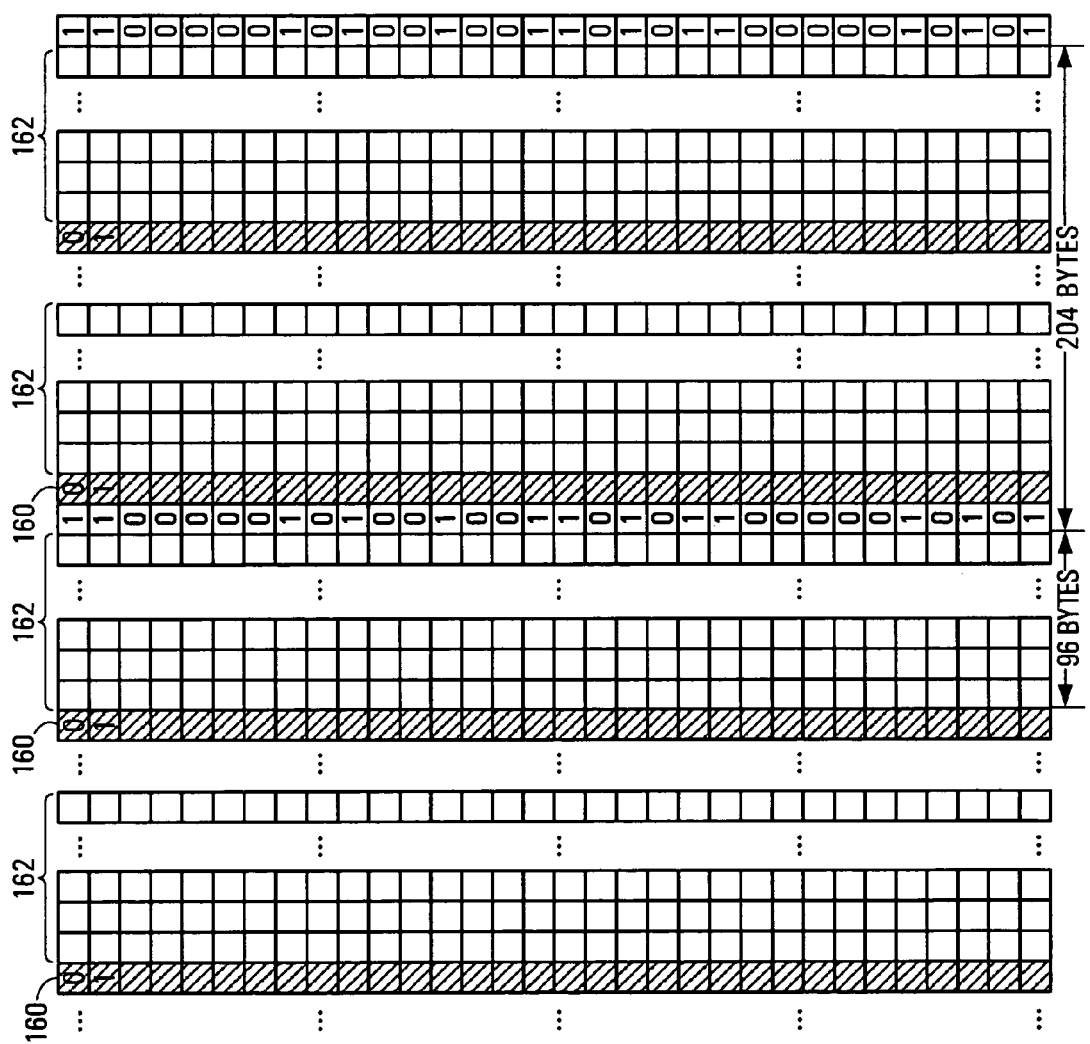
FIG. 10 shows another example of data burst encoding with fixed burst size.

In another example, the data burst encoding employs a fixed burst size. This is particularly suitable for some applications such as switch fabrics. An example of this is shown in FIG. 10 where the burst size is fixed at 96 bytes and the flow control word frequency is 204 bytes. Thus, in this case the burst control words 160 always start in lane 0 and each data burst 162 is 96 bytes.

It is noted that in some implementations packet transmissions are always sequential, such that an individual packet is always transmitted in byte order regardless of how it is interleaved between bursts on different channels. However a packet may span over two or more meta-frames.

HSPI Embodiment Mapping Multiple Bytes per Lane

Another embodiment of the invention will now be described with reference to FIGS. 11 to 16. In a previously described embodiment, data was encoded using 8b/10b encoding, with one byte per lane. In this embodiment multiple (for example eight) bytes per lane are encoded at a time, for example using 64b/66b encoding, with one encoder operation per lane. This embodiment provides a high speed packet interface (HSPI) that is narrow, high-speed channelized chip-to-chip interface. This interface can be used over any suitable number of communication channels; in the particular implementation described 1 to 64k communications channels can be accommodated. A simple control word structure is used to delineate the content of different channels. On top of this, but orthogonal to the channelization, constant Meta-frame size is employed to guarantee lane alignment and clock compensation. In the example described, the meta-frame size is 16 kB. The protocol can operate independent of the number of lanes and lane rates. In some embodiments, in-band or out-of-band per-channel flow control, with a semantic similar to SPI4.2 is provided. In the described example, 64b/66b data encoding and scrambling is employed, but other encoding schemes may alternatively be employed. A raw transmission rate up to 6.25 Gbps per lane is achieved with some examples, and the overall interface performance scales with the number of lanes.

In another embodiment, a new 64b/67b encoding scheme for the data and control words is employed as described below.

Transmission Format

Data is transmitted across the HSPI interface via a variable number of serdes lanes. Conceptually, the HSPI interface has been designed to operate with any number of lanes, including only one, with no inherent maximum. Specific implementations may choose to fix their operation to a specific number of lanes.

It is assumed for the remainder of this example that the fundamental unit of data sent across the interface is an 8-byte word. Other word sizes are possible with appropriate modifications to the interface. This number is chosen to conform to the 64b/66b encoding chosen for the protocol, and it allows for flexibility in the width of the interface.

Figure 11:
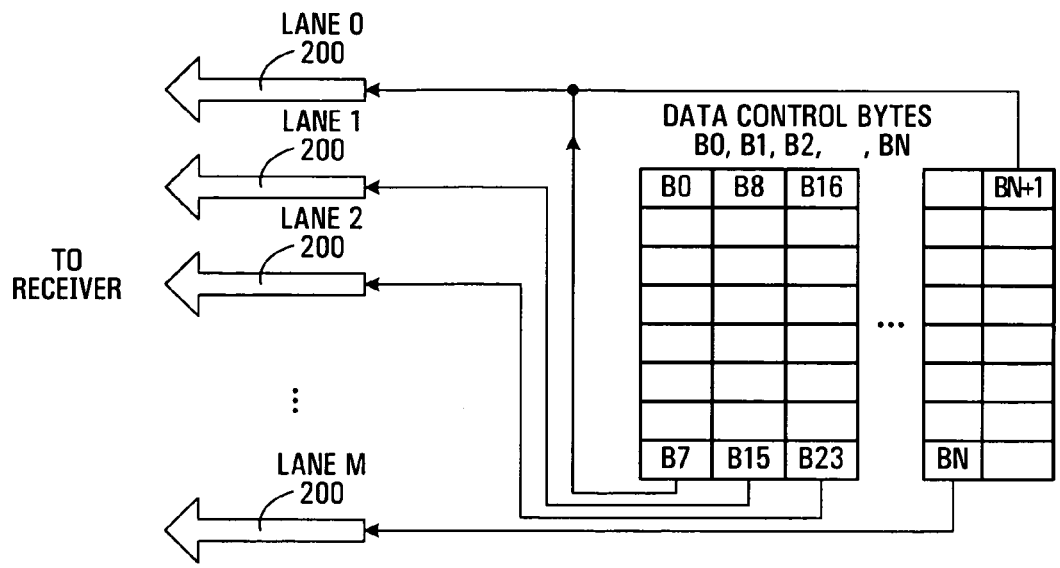
FIG. 11 is lane layout for another high speed serial interface provided by an embodiment of the invention.
Figure 12A:
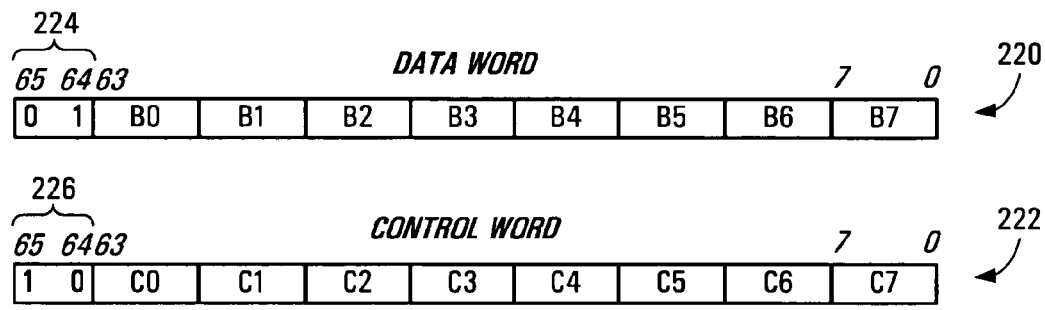
FIG. 12A shows an example of a data word format and a control word format.

Referring now to FIG. 11, an example of how data and control words are mapped to the lanes is provided. Shown are M lanes 200. A sequence of data/control bytes B0, B1, ..., BN is shown mapped to the M lanes with the first 8 bytes B0, ..., B7 transmitted on lane 0, the next eight bytes B8, ..., B15 transmitted on lane 1 and so on, with a total of Mx8 bytes being transmitted. Each set of eight bytes is transmitted together with 2 bit control code indicating whether the eight bytes contain data or control. FIG. 12A shows the format for a data word 220 where the control code 224 is "01" and a control word 222 where the control code 226 is "10". Data is transmitted from bit[65] to bit[0], with individual bytes transmitted from msb to lsb. Byte 0 is the first transmitted byte, which will correspond to the first byte of the data being transferred for a data word or the Block Type field for 64b/66b control words. Further details on the 64b/66b transmission encoding are provided below and in IEEE 802.3ae-2002 Section 49.2.4. hereby incorporated by reference in its entirety.

Figure 12B:
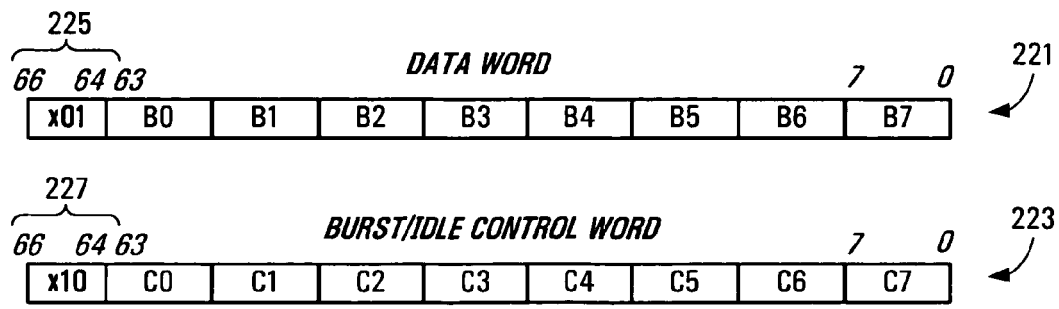
FIG. 12B shows another example of a data word format and a control word format.

In another embodiment, each set of eight bytes is transmitted together with 3 bit control code indicating whether the eight bytes contain data or control thereby creating a 64b/67b encoding structure. FIG. 12B shows the format for a data word 221 where the control code 225 is "x01" and a control word 223 where the control code 227 is "x10". The "x" in the control word is set to either a "1" or a "0" in order to limit baseline wander as detailed below under the detailed discussion of 64b/67b encoding. Data is transmitted from bit[66] to bit[0], with individual bytes transmitted from lsb to msb, consistent with IEEE 802.3ae-2002. Byte 0 is the first transmitted byte, which will correspond to the first byte of the data being transferred for a data word or the Block Type field for 64b/67b control words.

Burst Structure

First Example

The available bandwidth of the HSPI is divided into data bursts from the supported channels. Data packets are transferred across the interface by means of one or more bursts. In some embodiments, the burst size is a programmable option in 64-byte increments, with smaller bursts allowed to complete an end-of-packet. There does not necessarily need to be a fixed upper limit on the burst size.

Figure 13A:
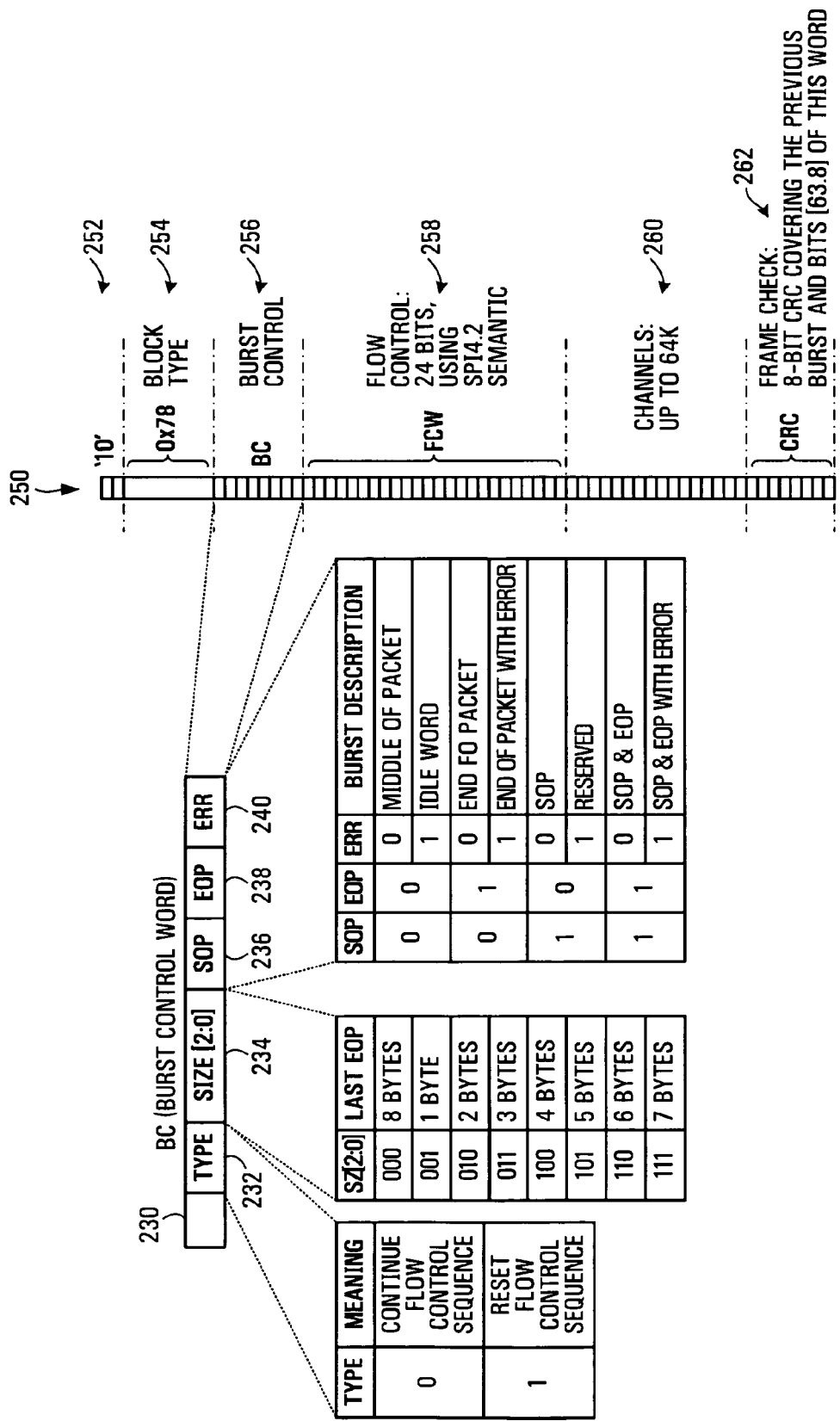
FIG. 13A shows a detailed burst layout as provided by an embodiment of the invention.
Figure 13B:
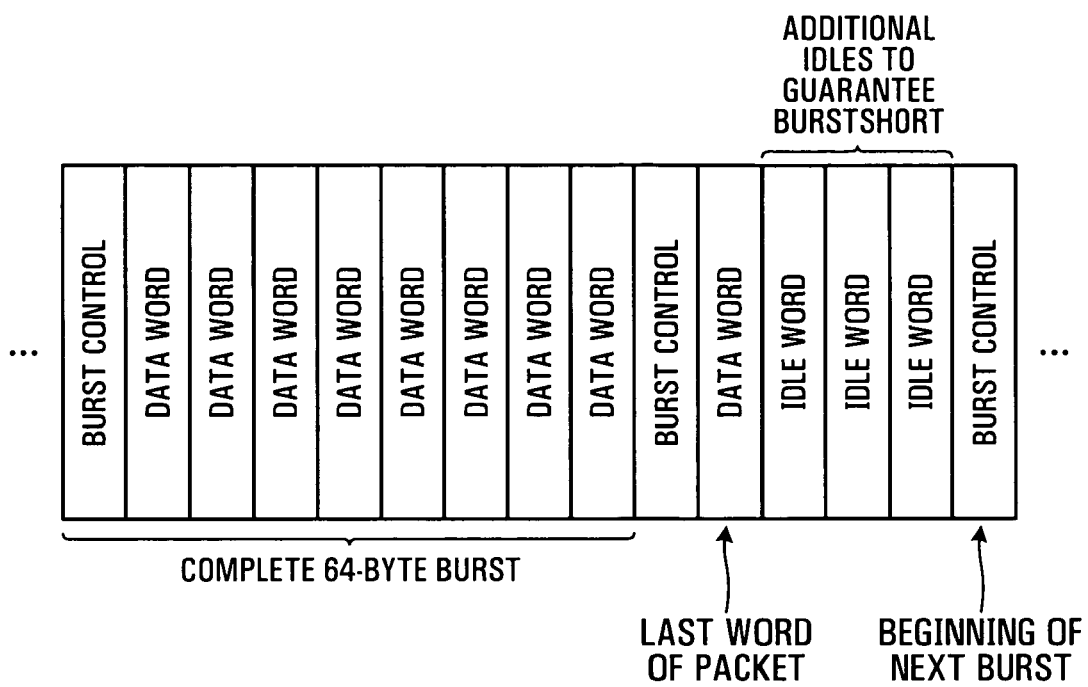
FIG. 13B shows how additional idle words can be inserted to guarantee a minimum burst short length.
Figure 13C:
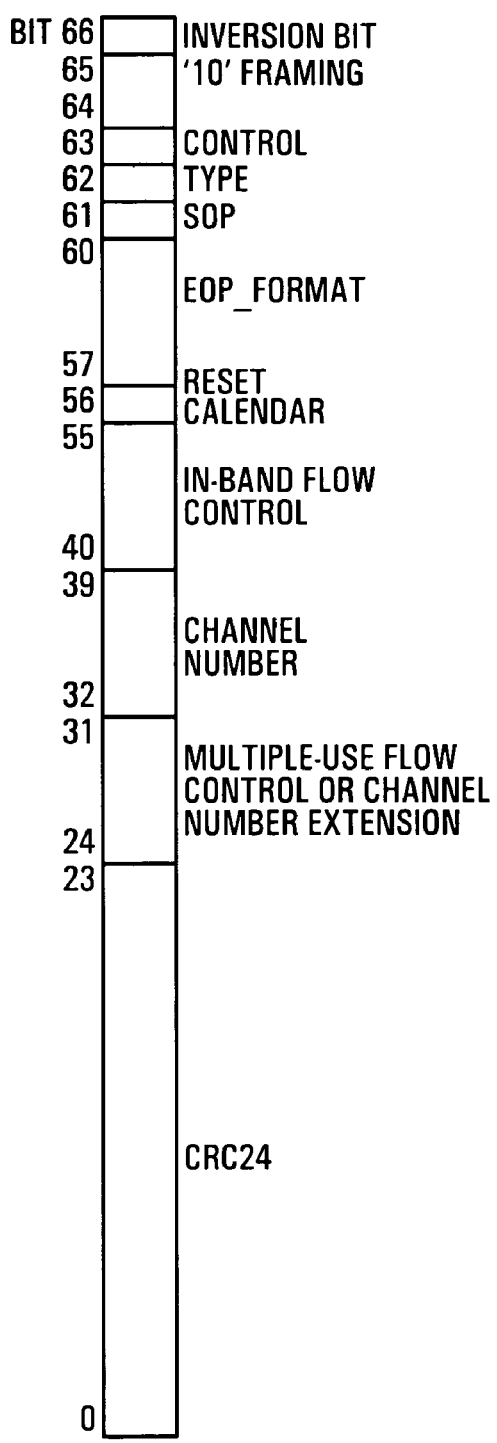
FIG. 13C is another example of a burst control word format.

The interface will typically operate by sending a burst of data that is equal to the size of the maximum burst or the remaining data left in the current packet, whichever is smaller. By way of example, using a maximum burst size of 256 bytes, a packet of 64 bytes will be transferred as one 64-byte burst, and a packet of 257 bytes will be transferred as two bursts, the first of 256 bytes and the second of 1 byte. To reduce the burden on the receiver to process multiple short end-of-packet segments, the transmitter always can separate segments by four word boundaries. For end-of-packet transmissions less than 32 bytes, Idle Control Words can be added after the Burst Control Word. An Idle control word might for example be indicated with (identified by SOP:EOP: ERR='001') where the control word format of FIG. 13A is employed. In another implementation, where the control word format of FIG. 13C is employed, Idle control words are identified by bit 63='1', and bit 62='0'.

Bursts are delineated by means of an 8-byte Burst Control Word. An example format for the Burst Control Word is illustrated in FIG. 13A generally indicated at 250 for a 64b/66b encoding. The Burst Control Word is identified in the data stream by using the '10' control code for bits[65:64] 252 defined below in the discussion of 64b/66b Encoding. There is a one byte "block type" 254 for control words that defines the type of the control word. Specific example uses of this field are provided below. There is a one byte burst control 256 described further below. This is followed by three bytes (24 bits) of flow control 258 described below. Next there are two bytes 260 that identify the channel for the current burst. Finally, there is a one byte CRC 262.

The first bit 230 of the Burst Control 256 is undefined. The Type field 232 identifies when the Flow Control calendar has returned to the beginning of the sequence. The first Burst Control Word will set this bit to '1' for the start of the Flow Control sequence. The 24 bits of flow control 258 contains a 2-bit Flow Control status per channel sent in channel order over multiple burst control words if necessary (i.e. if there are more than 12 channels), beginning with channel 0 and ending with the last channel implemented. If the number of channels is not a multiple of 12, remaining slots in the final Flow Control status will be ignored. In the following Burst Control Word the Type field will be set to '1' and the Flow Control calendar begins again with channel 0.

The Size Field 234 of the Burst Control Word identifies how many bytes of the last word of the burst are valid. Bytes that are invalid will be discarded by the receiver. By convention, bits [63:56] of the data word refer to Byte 0, bits [55:48] to Byte 1, and so on.

The Burst Control Word is inserted at before or after each data burst. The SOP 236, EOP 238, ERR 240, and Channel Number 260 fields are can be included and interpreted identically as in SPI4.2: EOP and ERR refer to the previous data burst, while SOP and Channel Number refer to the following data burst. The 16-bit Channel Number allows 1 to 64K discrete channels to be implemented.

When there is no data available to transmit, Idle Control Words will be transmitted. The transmitter will continue to update the Flow Control calendar, such that Flow Control information is always being communicated back to the receiver. Data and control integrity is ensured by means of the 8-bit CRC 262 placed in the Burst Control Word. This CRC is calculated against all valid data in the burst as well as all fields in the Burst Control Word except the CRC field itself. Invalid characters inserted between the last byte of the burst and the Control Word are not included in the CRC calculation. The initial value of the CRC register will be all and the CRC will be calculated in bit transmission order. An example of a suitable CRC polynomial is:

$$x^8+x^2+x+1$$

Burst Structure

Second Example

In some embodiments, for the purpose of segmenting a packet of arbitrary size into bursts, the following two parameters are defined:

(i) BurstMax: The maximum size of a data burst (preferably a multiple of 64 bytes)

(ii) BurstShort: The minimum size of a data burst (preferably a multiple of 32 bytes)

The interface for the most part operates by sending a burst of data of BurstMax length, followed by a Control Word. The scheduling logic in the transmitting device is free to choose the order in which channels are serviced, subject to the constraint of the flow control state. Bursts are transmitted on each channel until the packet is completely transferred, at which point a new packet transfer on that channel may begin.

Because the interface is channelized, end-of-packet may occur back-to-back on several channels with a very small amount of remaining data on each channel. As both transmitter and receiver memories may be ideally designed with a wide datapath, they would need to be clocked at very high rates to handle this scenario. To reduce this burden on the receiver and transmitter, the BurstShort parameter guarantees a minimum separation between successive control words.

Optional Scheduling Enhancement

The scheduling described above can result in some unused bandwidth at the end of a packet, depending on the packet length and BurstMax. When the packet length modulo BurstMax is small, such that there is a small amount of data remaining to transfer after the last BurstMax, extra Idle Words will be transmitted to enforce the BurstShort guarantee. In the worst case, this unused bandwidth will amount to (BurstShort−1) bytes per packet. FIG. 13B illustrates an example of the minimum separation guaranteed by BurstShort. In some embodiments, by looking ahead in the packet to identify the location of the EOP, a more efficient scheduling is realized. The following procedure illustrates one such mechanism.

An additional parameter, BurstMin, is defined subject to the constraints that BurstMin <=BurstMax/2 and BurstMin >=BurstShort.

The following additional variables are defined for the purpose of this illustration:

packet_length=the total length of the packet packet_remainder=the amount of data in the packet remaining to be sent once data transfer has begun data_transfer=the amount of data transferred on the current burst i=the number of bursts required to transfer the packet The decision algorithm governing the burst size calculation is as follows:

```
packet_remainder=packet_length for (x=1; x<=i; x++) { if (packet_remainder>=BurstMax+BurstMin) then
    data_transfer=BurstMax else if (packet_length MOD BurstMax<BurstMin) &&
    (packet_remainder>BurstMax) then data_transfer=BurstMax−BurstMin else data_transfer=packet_remainder packet_remainder=packet_remainder−data_transfer}
```

This function has the effect of guaranteeing that the last burst of a packet will have a size between BurstMin and BurstMax, avoiding the problem of multiple short end-ofpacket segments. However, in order for this algorithm to operate properly, BurstMin cannot be more than half of Burst-Max.

As an example, a packet of length 513 bytes is to be transferred across the interface with BurstMax=256 bytes and BurstMin=64 bytes. In this case three bursts would be sent:

Burst 1=BurstMax=256 bytes

Burst 2=BurstMax−BurstMin=256−64=192 bytes

Burst 3=(packet_remainder MOD BurstMax)+Burst-Min=(257 MOD 256)+64=65 bytes

If instead the packet was 511 bytes, only two bursts would be sent:
Burst 1=BurstMax=256 bytes
Burst 2=packet_remainder MOD BurstMax=255 bytes Implementations may tune the BurstMax and BurstMin parameters as desired, subject to the constraints defined above. More generally, in some embodiments any mechanism can be employed that re-organizes burst sizes so that small bursts at the end of the packet are avoided.

This optional algorithm is intended to guide implementations toward an efficient mechanism of transporting bursts. However, there is no additional burden placed on the receiving logic if the transmitter follows a different procedure for segmenting packets, as long as the BurstShort parameter is observed. As an example, there may be situations in converting from one interface type to another where reformatting bursts would impose an unnecessary burden. Other scheduling algorithms are possible, and designers are free to create them subject to the constraints defined above.

Control Word Format for 64b/67b Encoding

Bursts are delineated by means of an 8-byte Control Word. The Control Word is identified in the data stream by using the 'x10' control code for bits[66:64] and bit[63]='1'. The Burst and Idle Control Word formatting is illustrated in FIG. 13C and the Table below.

| Idle/Burst Control Word Format | | |
|---|---|---|
| Field | Bit Position | Function |
| Inversion | 66 | Used to indicate whether bits [63:0] have been inverted to limit the running disparity; 1 = inverted, 0 = not inverted |
| Framing | 65:64 | 64/67 mechanism to distinguish control and data words; a '01' indicates data, and a '10' indicates control |
| Control | 63 | If set to '1', this is an Idle or Burst Control Word; if '0', this is a Framing Layer Control Word |
| Type | 62 | If set to a '1', the channel number field is valid and a data burst follows this control word; if set to a '0', the channel number field is invalid and no data follows this control word |
| SOP | 61 | Start of Packet. If set to a '1', the data burst following this control word represents the start of a data packet; if set to a '0', a data burst that follows this control word is either the middle or end of a packet |
| EOP_Format | 60:57 | This field refers to the data burst preceding this control word. It is encoded as follows: '1xxx' - End-of-Packet, with bits [59:57] defining the number of valid bytes in the last 8-byte word in the burst. For example, Bits[59:57] might be encoded such that '000' means 8 bytes valid, '001' means 1 byte valid, etc., with '111' meaning 7 bytes valid '0000' - no End-of-Packet, no ERR '0001' - Error and End-of-Packet All other combinations are left undefined. |
| Reset Calendar | 56 | If set to a '1', indicates that the in-band flow control status represents the beginning of the channel calendar |
| In-Band Flow Control | 55:40 | The 1-bit flow control status for the current 16 channels; if set to a '1' the channel is XON, if set to a '0', the channel is XOFF |
| Channel Number | 39:32 | The channel associated with the data burst following this control word; this value is randomized using a PRBS7 for Idle control words (see below) |
| Multiple-Use | 31:24 | This field may serve multiple purposes, depending on the application. If additional channels beyond 256 are required, these 8 bits may used as a Channel Number Extension, representing the 8 most significant bits of the Channel Number. If additional in-band flow control bits are desired, these bits may be used to represent the flow control status for the 8 channels following the 24 channels represented in bits [55:32]. These bits may also be reserved for application-specific purposes beyond the scope of this specification. |
| CRC24 | 23:0 | A CRC error check that covers the previous data burst and this control word |

Burst Control Words (Type='1') identify the beginning of a data burst. Each burst data transfer begins with a Burst Control Word, and this indicates that the SOP and Channel Number fields apply to the data immediately following. When the Burst Control Word falls between data bursts, the EOP_Format and CRC fields will apply to the data immediately preceding, and the SOP and Channel Number fields apply to the data immediately following (the intention is to operate similarly to the SPI4.2 burst control semantic).

Idle Control Words (Type='0') are transmitted when there is no new data available to send. Because the flow control information must always be sent to the receiving device, the flow control fields are valid in both Idle and Burst Control Words, and the transmitter will always send valid flow control status in both types of control word. To avoid false scrambler synchronization, a random number can be written into the Channel Number field in Idle Control Words. This random number can be generated using a PRBS7 function according to the following polynomial:

$$x^7+x^6+1$$

The EOP_Format Field of the Burst Control Word identifies how many bytes of the last word of the burst are valid. Bytes that are invalid will be discarded by the receiver. By convention, the first valid byte will occur at bit field [63:56], the second valid byte at bit field [55:48], etc. Data and control integrity is ensured by means of the 24-bit CRC. The CRC24 is calculated against all valid data in the burst and all the fields in the Control Word.

Flow Control

First Example

The HSPI provides a mechanism for signalling per-channel backpressure. To provide this function, the Flow Control fields of the Control Word are used to communicate receiver status back to the transmitting device. In some embodiments, the Flow Control Word structure is chosen to match the semantic of the OIF's SPI4.2 flow control channel (see Section 6.2.2 of the SPI4.2 standard hereby incorporated by reference in its entirety). The 24-bit Flow Control field is divided into a repeating sequence of 2-bit status values. The sequence begins with channel 0 status in bits [32:33] of the Burst Control Word, channel 1 status in bits [34:35], and so on. As described above, the reset calendar field is used to reset the status calendar.

In SPI4.2 there are two credit levels granted, which are re-used in some embodiments:

MaxBurst1: the credits granted by the STARVING status
MaxBurst2: the credits granted by the HUNGRY status (MaxBurst2<MaxBurst1)

The base unit of MaxBurst1 and MaxBurst2 is the transmission burst size; e.g. for an implementation with a burst size of 256 bytes 1 credit will represent the permission to transmit 256 bytes.

SPI4.2 defines three Flow Control status values:

STARVING: FIFO underflow is imminent, and MaxBurst1 credits are granted.

HUNGRY: credits up to MaxBurst2 or the previously indicated credits, whichever is greater, are granted.

SATISFIED: FIFO overflow is imminent, and no more credits are offered.

In some embodiments, for additional implementation flexibility, the meaning of SATISFIED is redefined to be the following:

SATISFIED: all current credits are cancelled.

With this definition it is easier to design optimal FIFO sizes in the receiver; if the receiver detects that it's FIFO is in danger of overfilling it can send a SATISFIED status to the transmitter, immediately halting the current transmission. Once the FIFO drains sufficiently the receiver may reactivate the transmitter on that channel by sending a HUNGRY or SATISFIED status.

Because a burst control word is sent at the beginning of each burst data transmission, the worst case frequency of flow control information is one message every maximum burst length, but if there are more channels than can be represented in one burst control word, not every message will have flow control information for every channel. It is left to the implementer to select the maximum burst size required to support the desired number of channels and receive FIFO depth.

As an example, assuming a link bandwidth of 24 Gbps, 24 channels, and a maximum burst size of 256 bytes, the bandwidth of flow control information transmitted would be:

(3 flow control bytes)/(256 data bytes+8 control bytes)*(24 Gbps)=272 Mbps

At this frequency it is expected that receiver FIFO's may be sized below 1 KB per channel.

Flow Control

Second Example

In another embodiment, on-off flow control is implemented. On-off flow control status can be communicated with a single bit of status for each supported channel. For example, a '1' can be chosen to identify the 'ON' state, indicating permission for the transmitter to send data on that channel. In which case a '0' identifies the 'OFF' state, indicating that the transmitter should cease sending data on that channel.

There is no concept of credits with this protocol; once a channel is indicated as ON, the transmitter may send as much data as it chooses on that channel until the flow control status is changed to OFF. The threshold whereby the receiver chooses to switch between the ON and OFF states is an implementation specific detail that might for example be dependent upon the number of channels supported, depth of receive buffers, and the flow control latency of the given environment. In some embodiments, with on-off flow control, the transmitter will send a complete packet for a given channel before switching to a different channel. If the flow control status changes to OFF, the transmitter may either finish the current packet and then switch to a new channel, or stop the transmission immediately and block all other channels.

In some embodiments, the flow control channels are mapped to a calendar, so that particular high-priority channels may be given more frequent flow control response. This leaves open the option of creating an arbitrary calendar structure that maps the status bits of the flow control messages to the actual channels; it is only necessary for both sides of the interface to be programmed identically.

In-Band Flow Control

When utilizing in-based flow control, the receiver makes use of flow control status transmitted in the Control Words sent across the interface as part of the normal data transfer. This option is provided for full-duplex implementations that require a minimum number of external signal pins.

As shown in FIG. 13C, in the example illustrated the Flow Control field of the Control Word is 16 bits, located in bit positions [55:40]. Bits [31:24] of the Control Word may also be used for 8 more bits of Flow Control, for a total of 24. These status bits represent the ON-OFF flow control status for each calendar channel, with current calendar entry X at bit [55], calendar entry X+1 at bit [54], and so forth. To synchronize the start of the calendar the Reset Calendar bit is provided in the Idle/Burst Control Words; when this bit is a '1', channel 0 status is in bit [55]. When Reset Calendar is a '0', the calendar continues sequentially from where it left off in the previous Control Word. Once all the channels' status has been communicated, the transmitter will set the Reset Calendar bit and the sequence will repeat. Extra bits not required in the last Control Word of the calendar (i.e., when the number of channels is not a multiple of the number of status bits) will be ignored by the receiver and set to 0 by the transmitter.

Flow control information can be sent in both Idle and Burst Control Words.

Because Control Words will be sent between each burst data transmission, the worst case frequency of flow control information is one message every maximum burst length. It is left to the implementer to select the BurstMax required for the desired flow control bandwidth.

As an example performance calculation, for a 24 Gbps interface with a 256-byte burst and 48 channels, the data in flight during the calendar transmission will be:

$$\text{Data in flight} = (2 \text{ bursts}) * (256 \text{ bytes/burst}) + (2 \text{ control words}) * (8 \text{ bytes/control word}) = 528 \text{ bytes}$$

Re-use of the In-Band Flow Control Field

For implementations that use out-of-band flow control, the in-band flow control field of the Control Word will be unused. In this case it is possible to re-use this field for vendor-specific information.

Full-Packet Mode

The described implementation allows the interleaving of transmissions from different channels. However, it also accommodates applications that require complete packet transmissions. For these applications the transmitting device will simply avoid switching from one channel to another until the current channel's packet completes transmission. The transmitter will not begin a packet transmission until it has been granted enough credits by the receiver on the desired channel to accommodate the currently queued packet. If the transmitter receives a SATISFIED Flow Control status it is allowed to complete the current packet transmission before ceasing transmission on that channel. For this case MaxBurst2 should be set to at least 2 MTU's, and MaxBurst1 set to at least 1 MTU, to guarantee sufficient credits are always provided to the transmitter.

Out-of-Band Flow Control

First Example

Figure 16:
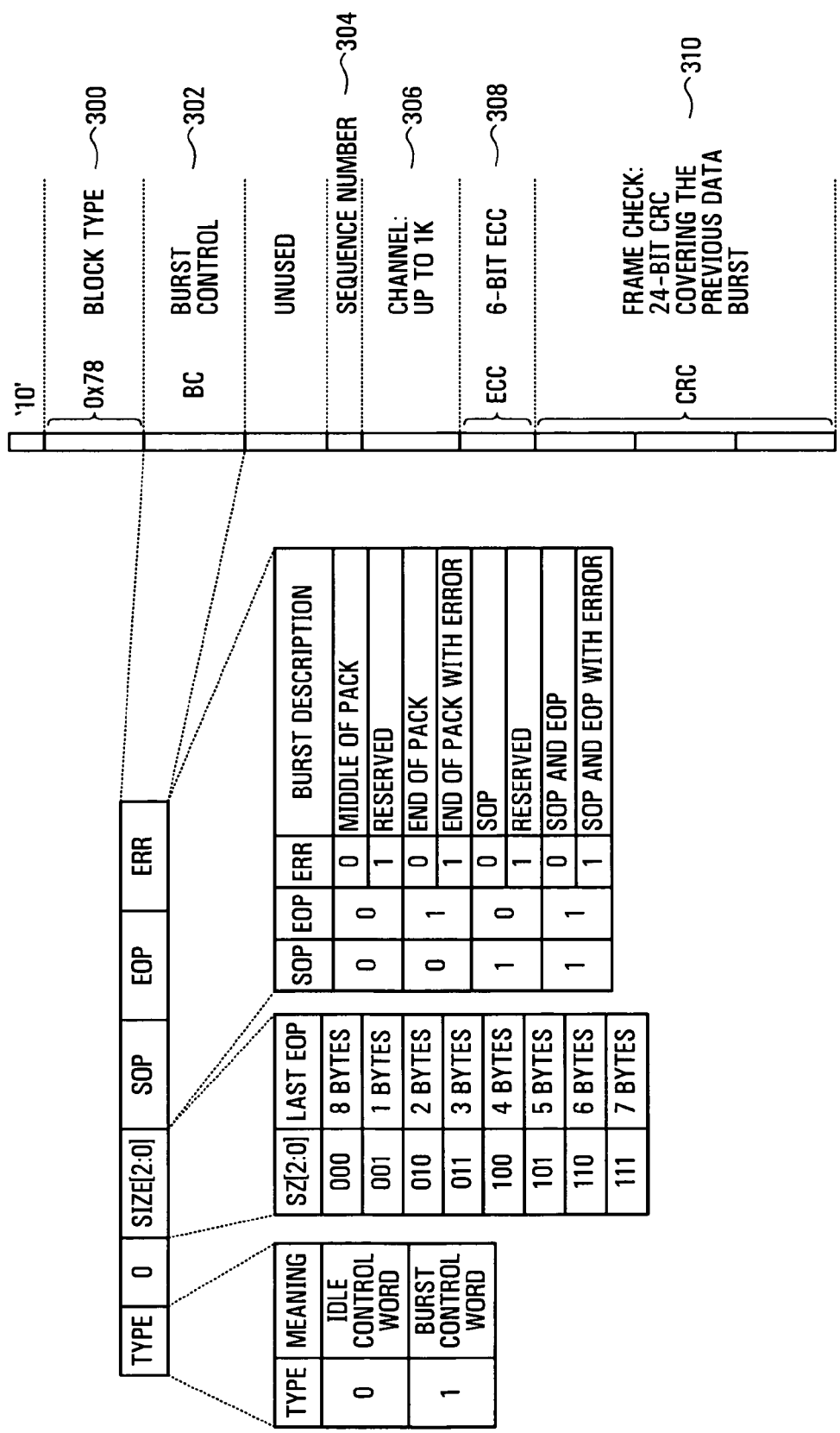
FIG. 16 shows a detailed burst layout as provided by another embodiment of the invention.

In the above-described embodiment, the flow control information is transmitted in-band as part of the burst control word. In another embodiment, the flow control information is transmitted separately from the burst control word, either in-band or out-of-band. An example of a burst control word for such an embodiment is shown in FIG. 16. This burst control word differs from that of FIG. 13A in that there is no longer any flow control information within burst control word. The burst control word format of FIG. 16 consists of a block type 300, burst control 302 that has the same format as that of FIG. 13, a sequence number field 304, the channel identifier 306, an error control code (ECC) 308 that in the example consists of a 6-bit ECC, and a 24 bit CRC 310 covering the previous data burst. The ECC is provided to allow some error correction capability. In the case of an 8 bit ECC, it can be used to correct single-bit errors in the control information, and to identify double-bit errors.

Figure 17A:
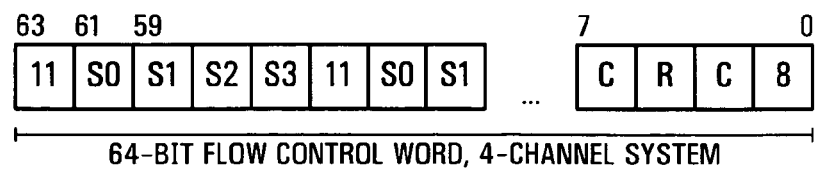
FIG. 17A is a depiction of how flow control information may be formatted for out-of-band transmission.

In some embodiments, the flow control information is transmitted out-of-band as shown in FIG. 17A, and is used to signal per-channel backpressure. An additional serdes lane is provided for this purpose, and is solely used to communicate flow control information, or a completely separate interface may be employed. The 64b/66b encoding may also be performed on this lane to guarantee word boundary alignment and transition density. In some embodiments, the flow control structure is chosen to match the semantic of the OIF's SPI4.2 flow control channel (see Section 6.2.2 of the SPI4.2 standard). The sequence begins with the '11' framing pattern, followed by the 2-bit channel 0 status, channel 1 status, and so on. Once the end of the calendar sequence is reached, another '11' framing status pattern is sent and the sequence is repeated. Because the framing pattern uniquely identifies the start of the calendar, the sequence is not locked into any specific positions within the 64-bit flow control word, and the sequence carries over from one word to the next in calendar order.

By using a serdes lane to transmit flow control information, the flow control bandwidth is increased substantially from that offered in SPI4.2. There is no requirement for the flow control serdes rate to match the rate of the data portion of the interface; it is left up to the implementer to choose an appropriate bandwidth. As an example, assuming the following:

Link bandwidth of 24 Gbps
24 channels
Maximum burst size of 256 bytes
Serdes rate of 4.25 Gbps The bandwidth of flow control information transmitted would be:

$$(48 \text{ flow control bits})/(48+2 \text{ framing bits})*(64/66 \text{ encoding})*(4.25 \text{ Gbps})=3.96 \text{ Gbps}$$

At this frequency it is expected that the receive FIFO's may be sized below 1 KB per channel. In another embodiment, a similar control word is transmitted in-band on one or more of the lanes used to transmit data.

Out-of-Band Flow Control

Second Example

In a second example, the flow control channel will be protected with a 4-bit CRC code that covers up to 64 channels of information. This CRC code is transmitted MSB to LSB (CRC[3] to CRC[0]).

Figure 17B:
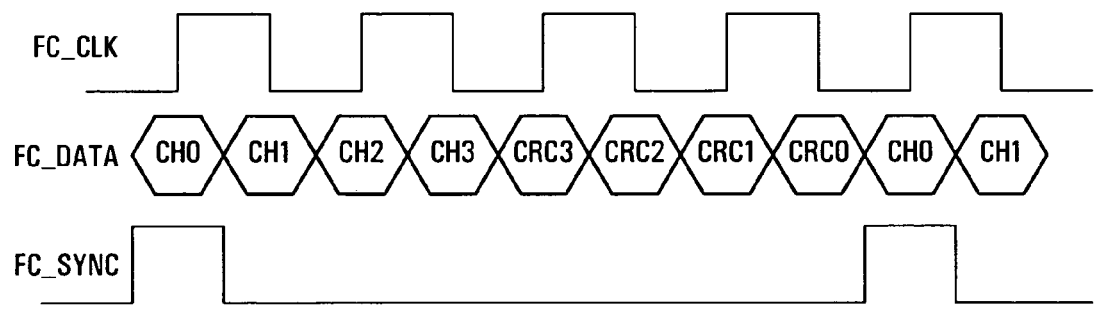
FIG. 17B is a detailed example of how a flow control signalling can be implemented.
Figure 18:
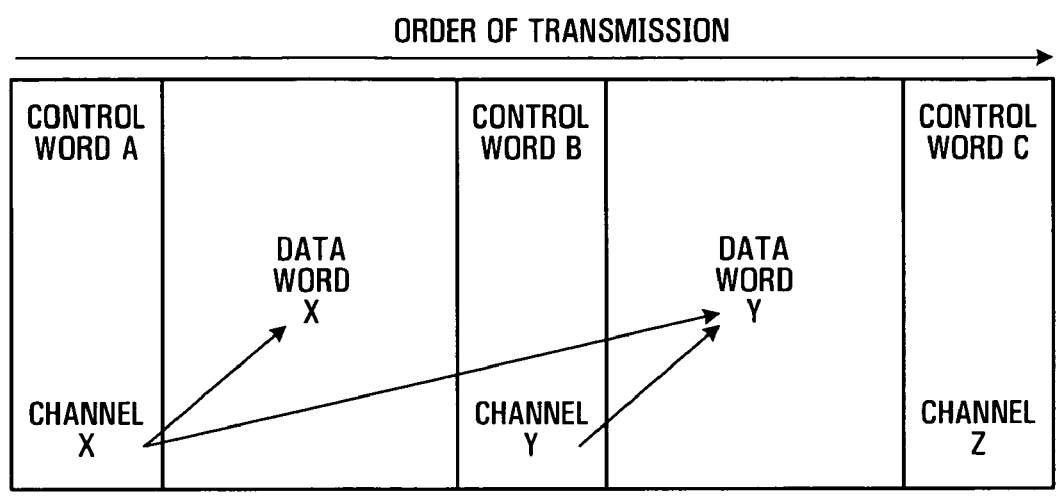
FIG. 18 is depiction of a loss of control word error condition.

As shown in FIG. 17B, FC_CLK is used to clock FC_DATA on both the rising and falling edges. At the maximum rate of 100 MHz, for a hypothetical implementation supporting 48 channels and 24 Gbps, the worst-case data in flight will be:

$$FC\_CLK \text{period} = 10.4 \text{ ns}$$

$$\text{Time in flight} = (10.4 \text{ ns})/(2 \text{ bits}/clk)*(48 \text{ channels}+4 \text{ } CRC \text{ bits}) = 271 \text{ ns}$$

$$\text{Data in flight} = (271 \text{ ns})*(24 \text{ Gbps}) = 813 \text{ bytes}$$

For an implementation supporting 256 channels and 24 Gbps, the worst-case data in flight will be:

$$\text{Time in flight} = (10.4 \text{ ns})/(2 \text{ bits}/clk)*(256 \text{ channels}+16 \text{ } CRC4 \text{ bits}) = 1.42 \text{ } \mu\text{sec}$$

$$\text{Data in flight} = (1.42 \text{ } \mu\text{sec})*(24 \text{ Gbps}) = 4.26 \text{ KB}$$

Framing Layer

64b/66b Encoding

An encoding/scrambling method is used for a serial interface to delineate word boundaries, to provide randomness to the EMI generated by the electrical transitions, to allow for clock recovery, and to maintain DC balance. The encoder also provides a control structure that can be used to align multiple lanes and to compensate for clock differences between the transmitting and receiving devices. As detailed above, a an optional encoding protocol for the HSPI is 64b/66b, but other protocols are possible. This is the encoding used for the IEEE 802.3ae 10 Gigabit Ethernet specification and is well-defined, widely implemented, and broadly understood. 64b/66b solves the problem of word boundary delineation through the use of two additional bits prepended onto each 64-bit data or control word. If these sync bits are "01" they signify a data word, and if they are "10" they signify a control word. The combinations "00" and "11" are not allowed. By searching for the valid patterns in the received data stream, the receiving device can unambiguously determine the location of the word boundary after a set number of data words, and it will maintain lock by continually fixing on these two bits. To guarantee sufficient number of transitions in the data stream as well as to maintain DC balance, the 64b/66b code employs the following self-synchronous scrambling polynomial:

$$x^{58}+x^{39}+1$$

Only the 64 payload bits are scrambled—the two sync bits are never scrambled. Lane alignment and clock compensation are can be delivered through the use of the control characters specified in the 64b/66b definition. Two particular defined code words that can be used are:

$S_0D_1D_2D_3D_4D_5D_6D_7$ (Block Type 0x78) for the Burst Control Word;

$C_0C_1C_2C_3C_4C_5C_6C_7$ (Block Type 0x1E) for the Alignment and Skip Control Words.

All other 64b/66b codewords are left unused. An example alignment and compensation method that takes advantage of this is described below. The 64b/66b encoding creates an overhead of 3.12%, considered acceptable for this application. For further details on the 64b/66b encoding please refer to the IEEE 802.3ae-2002 specification section 49.2.4.

64b/67b Encoding

A weakness of the 64b/66b approach described above, however, is an unbounded baseline wander. Baseline wander is caused by the accumulated excess of 1's or 0's transmitted on an individual lane. An electrical transition has an associated time constant, which in high-speed interfaces will often not allow a full voltage swing before the next bit is transmitted. Therefore, a sustained imbalance in either the number of 1's or 0's can produce a movement in the center voltage of the differential pair's eye opening. Analysis of the 64b/66b scrambler polynomial shows that over a 64 Kbit time scale a running disparity in excess of +/−1,000 bits can occur, which can produce excessive eye shifts, cause complications in the design of receiver circuitry, and increase the bit-error rate.

To bound this effect, with the 64b/67b code, the bits of each transmitted word are inverted, or not, such that the running disparity always stays within some bound, for example a +/−65-bit bound. Each lane will maintain a running count of the disparity: a '1' bit increments the disparity by one and a '0' bit decrements the disparity by one. Before transmission, the disparity of the new word is calculated and then compared to the current running disparity. If the new word and the existing disparity both have the same sign, the bits within the word are inverted. An uninverted framing bit is supplied in bit position 66 so the receiver may identify whether the bits for that word have been inverted, as below:

Bit 66 Interpretation bit 66="0"→bits [63:0] are not inverted; the receiver may process this word without modification bit 66="1" Bits [63:0] are inverted; the receiver must undo the inversion before processing this word All bits in every word, including bit 66, are included in the running disparity count. The legal values of the three sync bits can be summarized as follows:

Bits [66:64] Interpretation
001 Data Word, no inversion
010 Control Word, no inversion
101 Data Word, bits [63:0] are inverted
110 Control Word, bits [63:0] are inverted
All others are illegal states The IEEE's 64b/66b code defines a procedure for locking to the sync bits. The receiver searches for a transition from high to low or low to high (the only legal sync codes), and selects this as a hypothetical sync pattern. In the next word position, the receiver again looks for one of the legal patterns; if a legal pattern occurs again it repeats this procedure, and if it does not it resets its state and searches for another legal pattern. In order to declare lock the receiver must observe 64 consecutive legal sync patterns. With the 64b/67b code, there is an additional sync bit, but only 50% of the possible combinations of these three bits are legal, the same as 64b/66b. As such, to achieve lock with an identically low probability of an incorrect sync, 64 consecutive legal sync patterns (defined above) must be observed by the receiver. The 64b/67b encoding creates an overhead of 4.5%. The code can be implemented to achieve lock with differing probability by changing the required number of consecutive legal sync patterns.

Figure 12C:
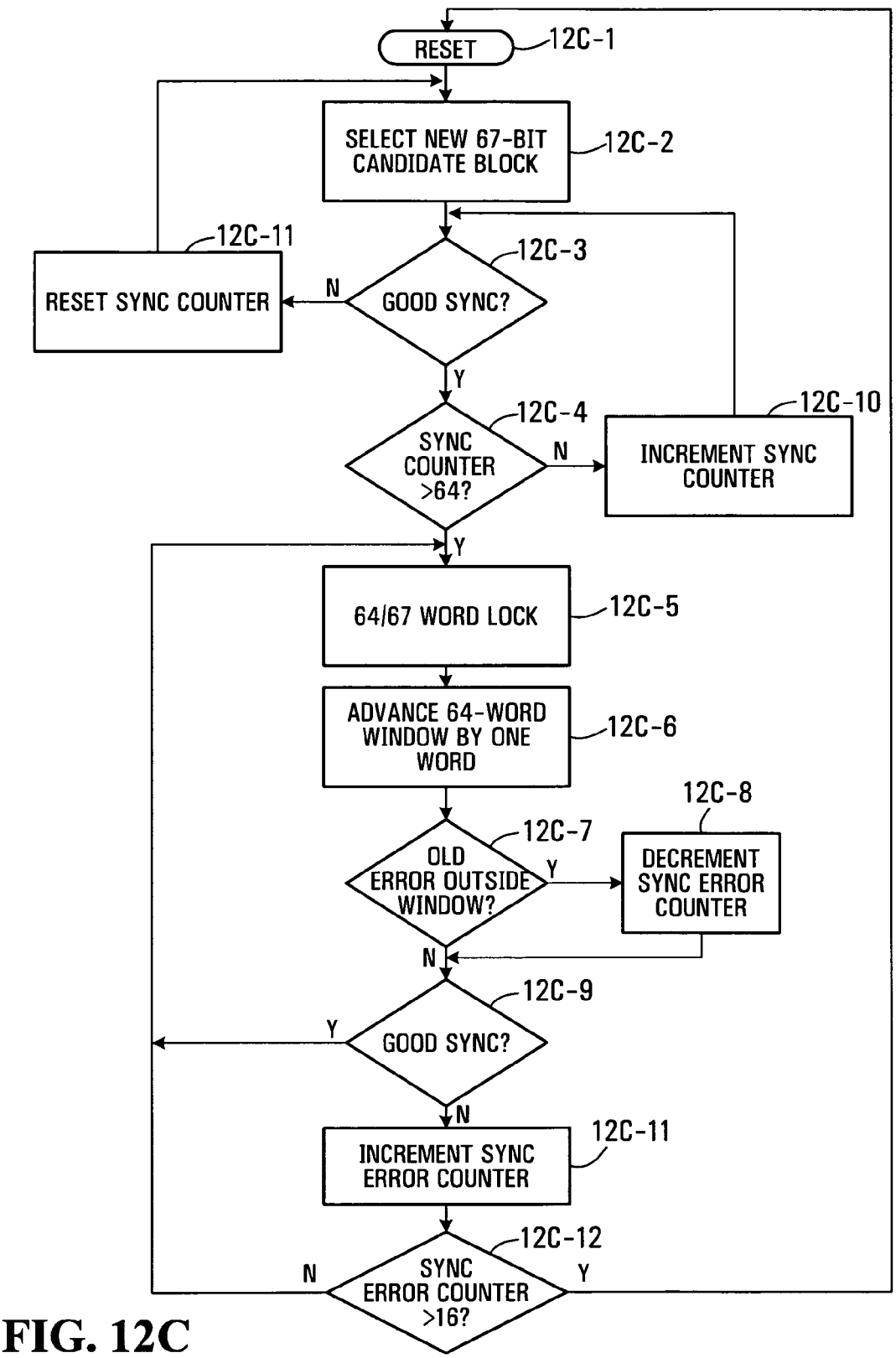
FIG. 12C is a flowchart of an example of performing synchronisation using a 64b/67b code.

The flow diagram for achieving and maintaining 64b/67b word boundary lock is shown in FIG. 12C. The method begins after there has been a reset as indicated at step 12C-1. A candidate 67-bit block is selected at step 12C-2, this being any three-bit segment. The test at step 12C-3 is whether or not the three-bit segment is a valid one of the four possible permutations for bits [66:64]. If not, no path step 12C-3, then the sync counter is reset at step 12C-11. On the other hand, if it is a valid permutation, yes path steps 12C-3, then if the sync counter is greater than 64 (or some other number selected to indicate sync has been achieved) yes path step 12C-4, then sync is achieved at least for the time being. If the sync counter is less than 64 (no path steps 12C-4) then the sync counter is incremented at step 12C-10. Steps 12C-2, 12C-3 and 12C-4 are repeated until the sync counter threshold is achieved.

If once the sync counter exceeds the threshold (yes path step 12C-4, then 64/67 word lock is achieved as indicated at step 12C-5.) Then, on an ongoing basis the state of synchronization is observed to see if synchronization is lost. This involves advancing the 64-word window by one word at step 12C-6. If there is a old error that is outside the window (yes path, step 12C-7) then a sync error counter is decremented at step 12C-8. If there is a still good sync as indicated at step 12C-9, yes path then word lock is still maintained. If the three-bit pattern after advancing the 64 word window is invalid, then a sync error counter is incremented at step 12C-11. Once the error counter exceeds some threshold, yes path step 12C-12, in the illustrated example this threshold being 16, the synchronization process is reset and the method continues back at step 12C-1. So long as the sync error counter is not exceeding the threshold (no path step 12C-12) word lock is still assumed to exist.

Meta-Frame

First Example

A Meta-frame is defined to guarantee that a minimum frequency of Alignment and Skip Control Words is sent across the interface to regularly align the multiple serdes lanes and to provide clock compensation. In some embodiments, the size of the Meta-frame is fixed, for example at 16 KBytes, short enough to guarantee a compensation for +/−100 ppm clock differences and long enough to minimize the bandwidth consumed by this overhead. Data cells reside in the 16 KB between alignment sequences in the Meta-frame.

Figure 14:
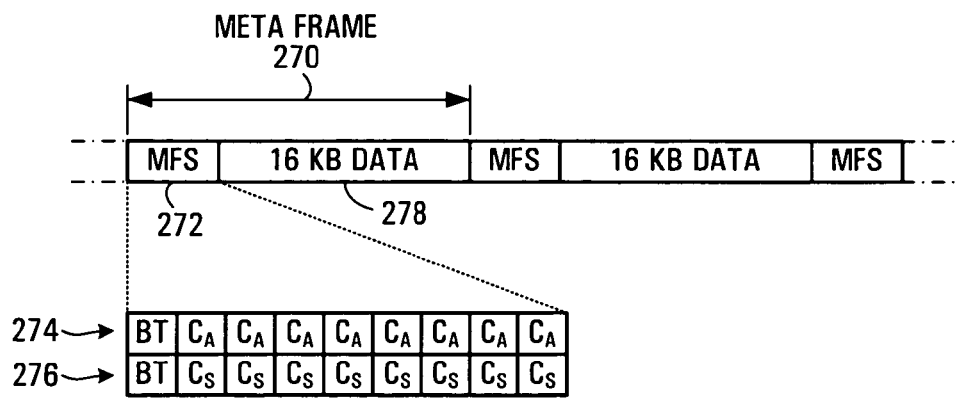
FIG. 14 shows an example of a meta-frame layout.

An example of a meta-frame structure is illustrated in FIG. 14. The meta-frame, generally indicated at 270 consists of a meta-frame separator 272 containing two control words. The two successive codewords are used to delimit the Meta-frame: in the particular implementation described, these are the Alignment Control Word 274 and the Skip Control Word 276 but others can be used. Each is identified by a respective Block Type (BT) value. For example '0x1E' might be used for alignment control words, and '0x66 for skip control words. The remaining fifty-six bits of the Alignment Control Word is filled with eight identical 7-bit values, which are chosen as 0b1111111. The Alignment Code Word 274 will appear after exactly 16 KB of data 278 has been transmitted since the previous Skip Control Word; this allows the receiver to unambiguously identify and align this pattern among the multiple lanes. The Skip Control Word uses a different 7-bit pattern for its remaining fifty-six bits, which is chosen as 0b0110110. In some embodiments, one Skip Control Word is inserted after each Alignment Control Word. If the receiver needs to compensate for a slower clock or faster clock than the transmitter it may silently discard this word or insert this word respectively. Using a 16 KB frequency, eight bytes will be sent every 16 KB, or at a ratio of 1:2,048. A 100 ppm differential in clock frequency represents a ratio of 1:10,000, so this Meta-frame frequency will meet the compensation requirement. The Meta-frame length is defined per lane, such that 16 KB is sent on each lane before each alignment sequence. With a Meta-frame size of 16,384 bytes the percentage of bandwidth available for data transfer is:

16,384/(16,384+16)=99.9%

The 16 KB data in each meta-frame is used to transmit bursts as described previously, with each data burst delineated by a burst control word. For example, in a 4 lane implementation, for the very first transmission lane 0 transmits an 8 byte burst control word (subsequent meta-frames do not necessarily align with lane 0 at the start of a burst) and 8 byte data words are transmitted on lanes 1, 2, 3, 0, 1, 2, . . . in sequence until the end of the burst. Then, a burst control word is transmitted in the next lane and so on. When the end of the 16 kB is reached the pattern of burst control word, data is interrupted to insert the two framing control words as described.

Rate Matching

Figure 15:
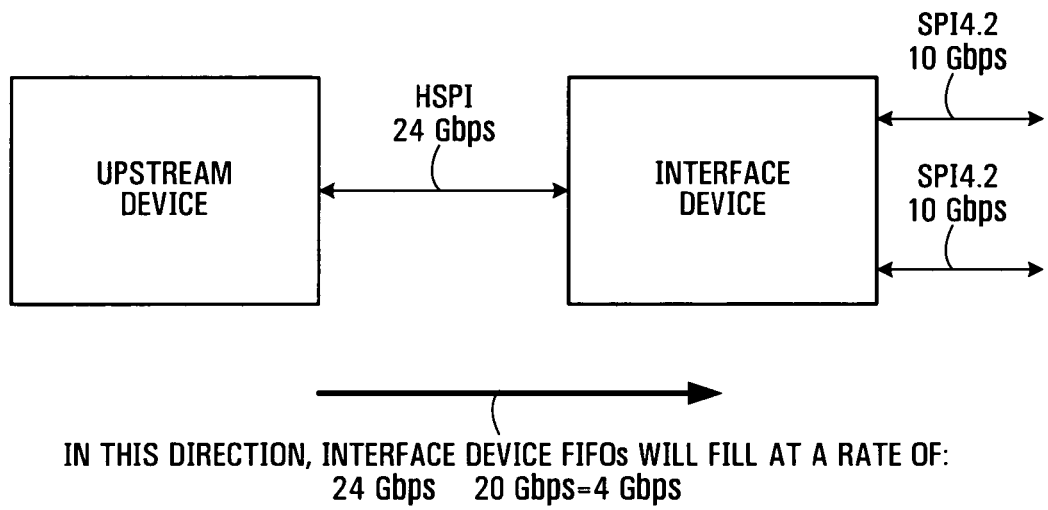
FIG. 15 shows an example of a rate matching scenario.

The Skip Control Word may serve the additional purpose of providing rate matching. Some applications may wish to translate between the HSPI protocol and an existing protocol such as SPI4.2. For these applications the bandwidth of the two interfaces may not match, creating a potentially expensive buffering function in the bridging device, as depicted in FIG. 15. One method to alleviate this situation is to insert additional Skip Control Words into the datapath. Because these are encoded with a unique Block Type and control pattern they may be unambiguously identified, and as such they can be inserted at any point in the data stream. The frequency of insertion can be left as a programmable option. If an HSPI receiver identifies a Skip Control Word at a point other than immediately following the Alignment Control Word it will silently discard it.

In another embodiment, a data rate ceiling is imposed upon the interface as a whole (i.e. all channels considered in aggregate). Idle words may be inserted by the transmitter between bursts to maintain this ceiling.

Meta-frame

Second Example

Figure 19:
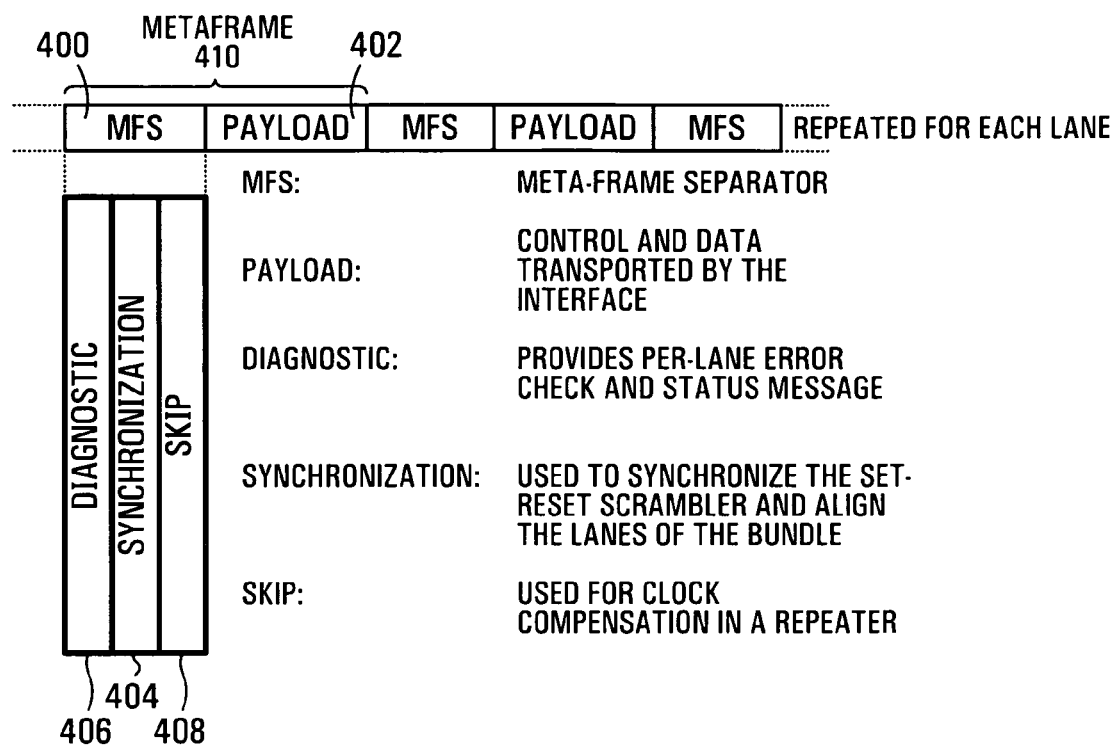
FIG. 19 is another example of a meta-frame layout.

In another embodiment shown by way of example in FIG. 19, the Meta-frame 410 is defined as a per-lane structure with a meta-frame separator 400 containing diagnostic 406, synchronization (analogous to the above-described alignment control word) 404, and skip words 408, following the payload data 402 (burst data and control information) carried on each lane. More generally, all frames should have the synchronization word. The diagnostic word may or may not be implemented. If implemented, diagnostic word may be present in some or all frames. The skip word may or may not be implemented. If implemented, one or more skip words may be present in some of the frames. In a particular implementation, every meta-frame has a synchronization word and a diagnostic word, and each frame contains zero, one or two skip words. In any case, the space between the synchronization words of consecutive meta-frames needs to be constant.

In some embodiments, the size of the Meta-frame is a programmable parameter, referenced here as MetaFrameLength, that applies to all lanes of the bundle. It represents the Synchronization Word, the Skip Word, and the amount of data before the next Synchronization Word. The Meta-frame structure is orthogonal to the data transmissions; the Synchronization and Skip Words may occur at any point within a data burst.

Set-Reset Scrambler

The 802.3 64b/66b code uses a self-synchronous scrambler on the payload. This has the advantage of not requiring any synchronization; the scrambler state is a function of the received data stream and can be recovered after the length of the scrambler (58 bits) are received. But this scrambler uses two feedback taps, and as such it has the property of replicating errors twice, so that a single-bit error on the line will become three single-bit errors at the receiver. Because the interface stripes data across the lanes within a bundle, this multiplication can push bit errors across words. The next errored word may or may not be part of the same burst, which means that the location of errors is no longer restricted within the burst. For multiple-bit errors this can reduce the error detection properties of the CRC24 and is an undesirable artifact.

To eliminate this scenario, in some embodiments a set-reset scrambler is employed. The set-reset scrambler does not feed the input data back upon itself; rather each bit is XOR'd with the current state of the scrambler, so no error multiplication may occur. The scrambler polynomial can, for example, be:

$x^{17}+x^{14}+1$

This scrambler repeats after 131 Kbits or 16 KB, considered a reasonable interval for this application. An example reset value of the scrambler is all 1's (0x1FFFF).

In order to correctly decode the transmitted data, the receiver must be synchronized with the state of the scrambler polynomial. The interface synchronizes via a unique 64-bit Synchronization Word that is transmitted as part of the Meta-frame.

Figure 20:
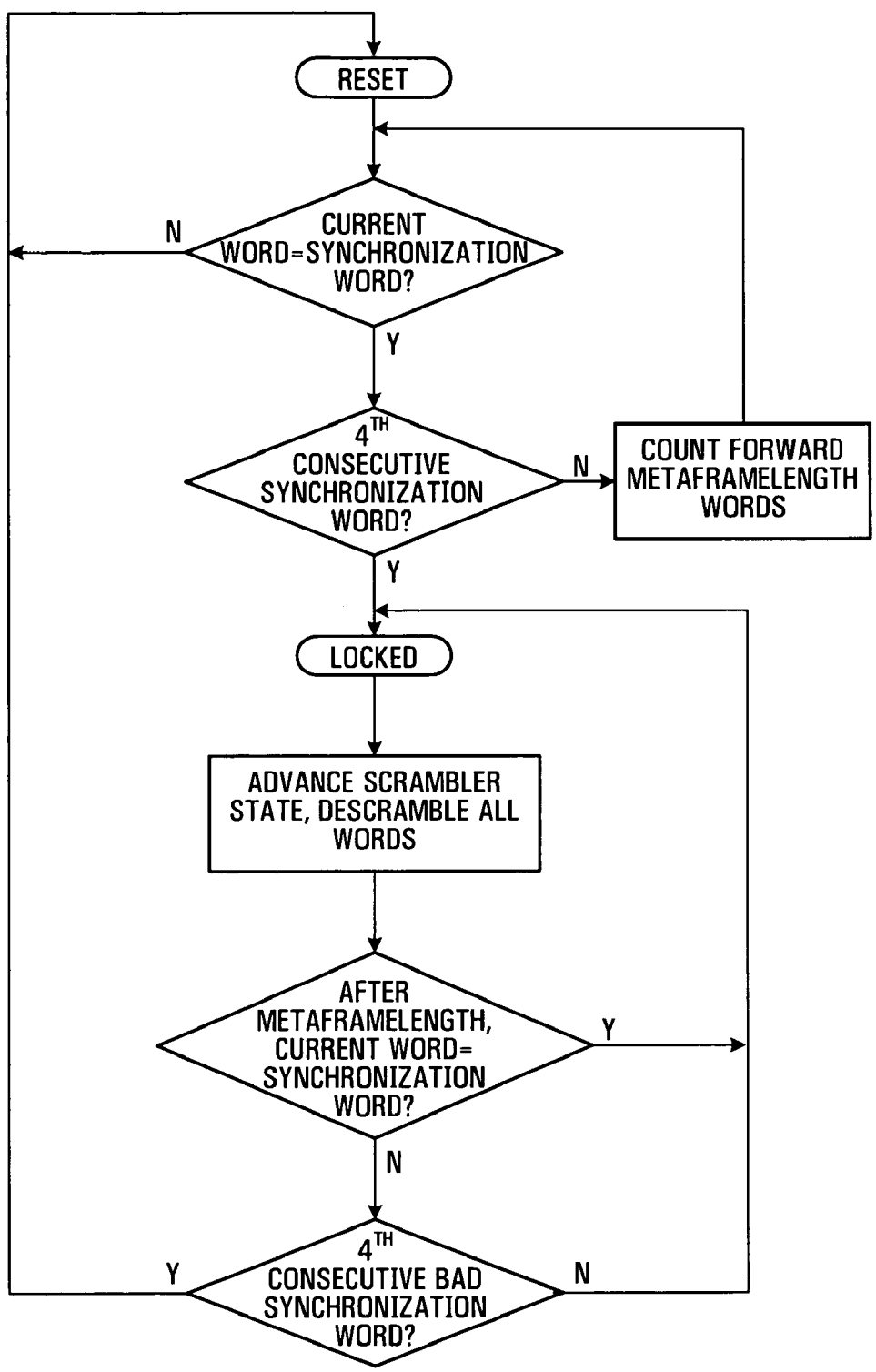
FIG. 20 is a flowchart of a method of performing synchronization using the meta-frame structure of FIG. 19.

At the start of operation, each lane will decode each received word using the reset state of the scrambler. If the received word is the Synchronization Word (matches all 64 bits), the receiver will count until a MetaFrameLength (measured in 8-byte words) quantity of data has passed, reset the scrambler, and look for another Synchronization Word. If it identifies the Synchronization Word it will begin the sequence again, until it has identified four consecutive Synchronization Words. The state flow is shown in the FIG. 20.

The length of the Meta-frame will always be exactly MetaFrameLength. The addition or removal of a Skip Word is allowed to manage clock compensation in an electrical repeater. The repeater may need to adjust the position of the Synchronization Word relative to how it was originally transmitted. This will always occur, however, such that the MetaFrameLength separation between Synchronization Words is maintained. Further details of this are proposed below under the heading "Clock Compensation".

If the Synchronization Word is not identified, the receiver will signal that an error has occurred. In order that a single error not destroy the synchronization, the receiver will identify where the Synchronization Word should have occurred (after MetaFrameLength) and reset the scrambler at that point. If four consecutive Synchronization Words are unidentified, the receiver will return to the Reset state and begin to search for the Synchronization Word by resetting the scrambler state.

In order to guarantee that Idle Control Words are never mistaken for Synchronization Words, the MetaFrameLength should be chosen such that it is a not a multiple of the periodicity of the PRBS7 polynomial used to randomize the channel number field in the Idle Control Words.

Lane Alignment

Once the word boundaries are identified and the scrambler properly reset, the lanes of the bundle must be aligned. Synchronization Words are sent across the interface at a fixed frequency to regularly align the datapath serdes lanes. To achieve alignment, the Synchronization Word is transmitted simultaneously across all lanes. The receiver then identifies these words, measures the skew between them across the lanes of the bundle, and adjusts its internal skew compensation logic accordingly. The architecture of this logic is an implementation specific detail.

Lane Diagnostics

Figure 21:
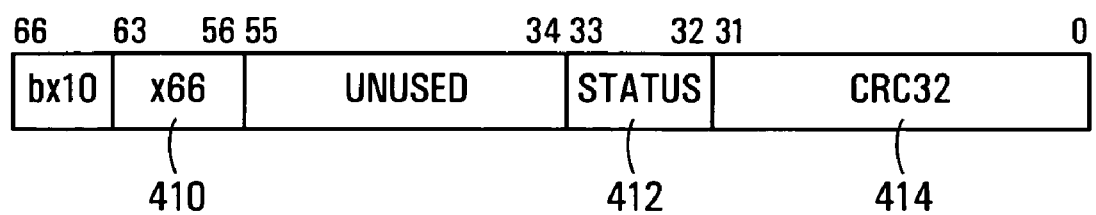
FIG. 21 is an example of a diagnostic word that might be used with the meta-frame format of FIG. 19.

An example format of the Diagnostic Word is shown in FIG. 21. The Diagnostic Word is identified with the Block Type value 410 of 0x66.

There are two functions assigned to the Diagnostic Word—a lane Status Message and per-lane error detection. The 2-bit Status field 412 defines a place for a per-lane status message to be sent from receiver to transmitter. The CRC32 414 is provided as a diagnostic tool on a per-lane basis, so that errors on the interface may be traced to an individual lane. It is calculated over all the data transmitted on the lane between Synchronization Words, except for the 64b/67b framing bits, but including bits [63:32] of the Diagnostic Word itself, with the CRC32 field padded to all-zeroes. The CRC32 following known polynomial might be used:

$$x^{32}+x^{28}+x^{27}+x^{26}+x^{25}+x^{23}+x^{22}+x^{20}+x^{19}+x^{18}+x^{14}+x^{13}+x^{11}+x^{10}+x^{9}+x^{8}+x^{6}+1$$

Diagnostic Words are counted as part of the MetaFrameLength just as Skip, Data, and Burst/Idle Control Words.

Some applications may desire that the receive side of an interface be able to signal to the transmitter that one or more of its receive links are inoperable. This may serve the purpose of increasing the Alignment frequency to speedup the process of re-acquiring alignment, assist in quickly enabling a failover to redundant links, or improving the speed of alternate failover mechanisms. For this purpose the Status Message can be included in some embodiments.

Bi-Directional Interfaces

For bi-directional implementations, the Status Message will be carried in bits [33:32] of the Diagnostic Word. The format of the message will be a Status Bit 1 representing the health of this lane, and Status Bit 0 representing the health of the entire interface. A '1' is defined to mean a healthy condition, and a '0' will indicate a problem.

Uni-Directional Interfaces

Figure 23:
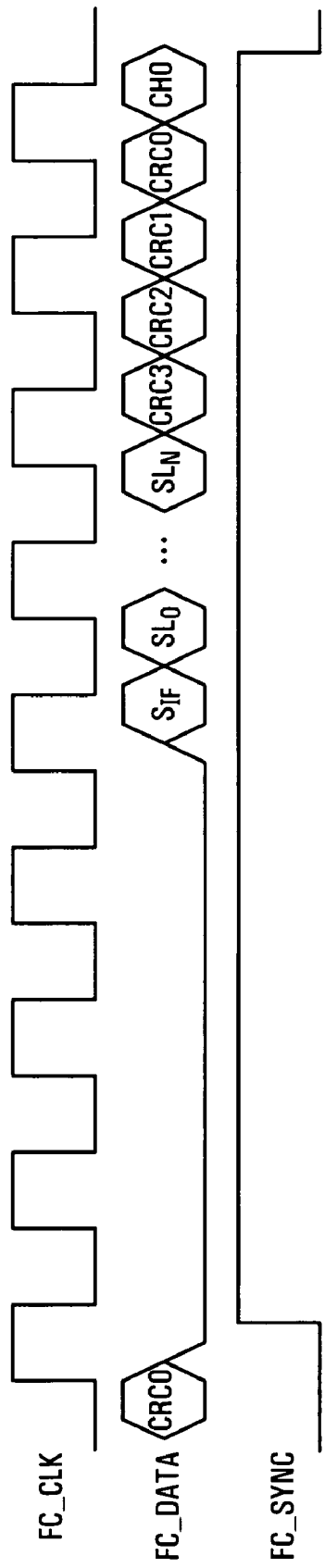
FIG. 23 is a timing diagram for conveying status information.

For uni-directional environments, an out-of-band status channel can be used to communicate the status. An out-of-band signalling protocol as shown in FIG. 23 can be employed for this purpose.

To avoid allocating flow control bandwidth to a Status Message that will normally not indicate any problems, the message is defined to appear only when one of the lanes identifies a problem. To prevent errors on the FC_SYNC line from inadvertently indicating a Status Message, the FC_SYNC signal will be held high for eight contiguous bits before transmitting the Status Message, as well as for the duration of the Status Message. The Status Message will consist of a single bit per lane of the interface, encoded as described above, plus an additional bit (SL0) to indicate the health of the interface as a whole; the message will be as long as the number of lanes in the interface, plus one, plus the 4-bit CRC. The CRC4 function that protects the out-of-band status will also protect the Status Message, and it will be sent immediately after the last Status Message bit. It will only be calculated to cover the Status Message and will operate orthogonally to the out-of-band status CRC4.

The transmission sequence will be as follows:

After detecting the lane problem, the receiver will wait until it has finished transmitting the current Flow Control calendar;

Next it will hold the FC_SYNC line high for eight bits, then transmit the Status Message;

After transmitting the last bit of the Status Message, the FC_SYNC line will be held high for the first bit of the new Flow Control calendar, then be driven low for the second bit of the calendar, and resume transmitting the Flow Control calendar normally;

After the Flow Control calendar has been transmitted in full, the Status Message will repeat.

The Status Message will alternate with the Flow Control calendar until the fault condition that initiated the Status Message is resolved.

Clock Compensation

The Skip Word can be used to enable clock compensation for a repeater function, by which the protocol may be electrically relayed across an intermediary device. There may be a slight difference in clock rate on each side of the repeater, and to bridge this gap it will be necessary to periodically remove data from the faster side of the interface, or add data to the slower side. As described above, the original transmitter inserts one Skip Word as the first word of the Meta-frame, after the Synchronization Word. If there is a repeater between the original transmitter and ultimate receiver, the repeater may compensate for a slower transmit clock by silently discarding this word. If this occurs, the repeater should still maintain the MetaFrameLength between the Synchronization Words. It performs this by shifting the first payload word of the next Meta-frame into the current Meta-frame, and scrambling it with the correct scrambler state at the end of the current Meta-frame.

Figure 22:
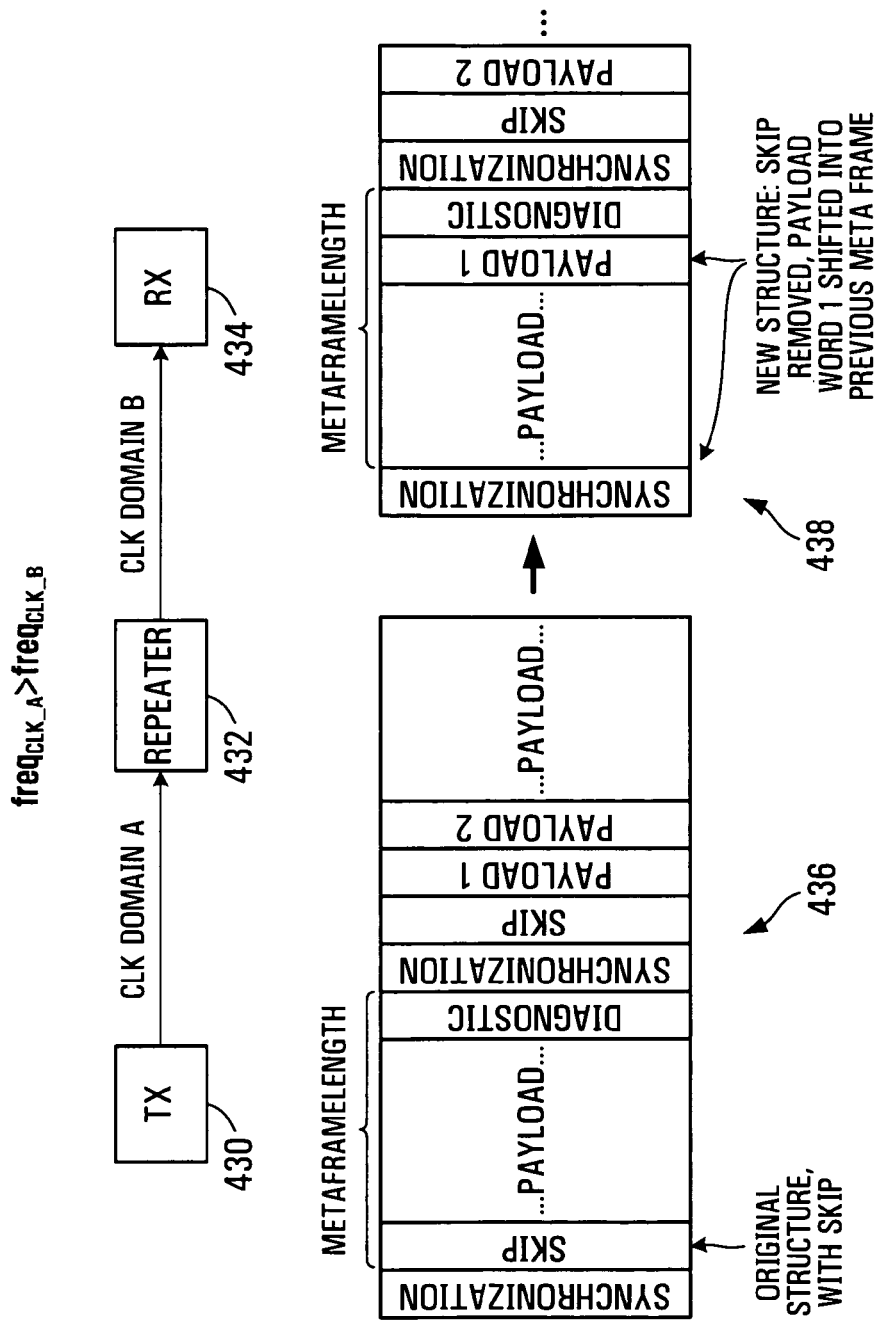
FIG. 22 shows a block diagram of a transmitter and a receiver with a repeater in between, and depicts how meta-frame contents can be adjusted to compensate for different clock domains.

Referring to FIG. 22, an example of skip word removal is shown. It shows a transmitter 430 in clock domain A, transmitting towards a repeater 432 that in turn transmits towards receiver 434 in clock domain B. The structure transmitted by the transmitter is indicated generally at 436, with a synchronization, skip, payload repeating pattern. The structure transmitted by the repeater 432 is general indicated at 438. In this case, it can be seen that the skip word after the first synchronization word has been deleted. Furthermore, the first payload word "payload 1" of the second payload has been moved into the first payload so as to maintain the separation between the two synchronization words.

If the repeater determines that it needs to discard a word due to a clock difference on only a subset of all the lanes, it still discards all the words across the interface simultaneously, not just on the affected lane(s). Using a MetaFrame-Length of 16 KB, eight bytes will be sent every 16 KB, or at a ratio of 1:2,048. A 100 ppm differential in clock frequency represents a ratio of 1:10,000, so this Meta-frame frequency will meet this compensation requirement.

The same approach can be used to perform compensation for a later clock that is faster. In that case, rather than removing skip words, one or more skip words can be inserted at the repeater. Furthermore, data words may be moved from preceding payload into a succeeding payload to maintain the constant separation between synchronization words.

Physical Layer

HSPI can be implemented as a multi-lane full-duplex interface or as a simplex interface with appropriate modifications as discussed herein. Differential pairs can be used to connect to serdes circuits on each end. Because the 8-byte block-coded words are striped across the individual lanes, there is no requirement on how many lanes to implement; the protocol scales from one to any number of lanes that are practical to allocate on a single IC. Current serdes technology allows for operation from 1-6.375 Gbps, including the widely-deployed XAUI frequency at 3.125 Gbps, 4G Fibre Channel at 4.25 Gbps, next generation PCI Express at 5 Gbps, and the OIF's CEI-6 specification of 4.976-6.375 Gbps.

Because of this wide variety in possible serdes technology the choice of the physical layer implementation is application specific.

In addition, because the defined protocol is independent of the number of lanes, in some embodiments lane resiliency is provided by continuing operation in the presence of the failure of a single lane or multiple lanes of a multi-lane interface. In such a case, the mapping of packets to lanes simply does the mapping to fewer lanes in the presence of a lane failure.

Implementations of the interface can be full-duplex in the sense that two chips are communicating with each other, simplex communication with another chip, or simplex communication with two other chips, one for receive and one for transmit.

Numerous modifications and variations of the present invention are possible in light of the above teachings. It is therefore to be understood that within the scope of the appended claims, the invention may be practiced otherwise than as specifically described herein.

We claim:

1. A method of constructing frames for transmission on a multi-lane serial interface, the method comprising:
  for each of a plurality of transmit channels, fragmenting packets into fragments;
  generating meta-frames having a size defined by a first dimension by a second dimension, the first dimension being a constant meta-frame length, the second dimension being a number of lanes of the multi-lane serial interface, each frame having a meta-frame separator and a payload;
  receiving per-transmit channel flow control information;
  wherein each payload comprises a plurality of bursts, each burst comprising a burst control word and an associated data burst, the burst control word identifying one of said transmit channels, each data burst comprising one of the fragments for the transmit channel identified in the associated burst control word, the transmit channels for which bursts will be included to transmit in a given meta-frame being selected as a function of the received flow control information;
  transmitting the frames over the multi-lane serial interface.

2. The method of claim 1 further comprising:
  transmitting per-receive channel flow control information included in-band within the payload of the meta-frames.

3. The method of claim 2 wherein the per-receive channel flow control information comprises flow control words distributed in predetermined locations along the frame length.

4. The method of claim 3 wherein the per-receive channel flow control words are distributed uniformly.

5. The method of claim 3 wherein each flow control word comprises one byte for each lane in each of the predetermined locations along the frame length.

6. The method of claim 5 wherein each flow control word comprises a framing pattern, channel status for a plurality of channels and parity checks.

7. The method of claim 3 wherein the flow control words are inserted at a defined frequency that is a configurable parameter such that a smaller frequency can be employed for a smaller number of channels, and a larger frequency can be employed for a larger number of channels.

8. The method of claim 1 wherein each meta-frame further comprises a preamble having a start character, and the payload is followed by a terminate character, and wherein the payload has a size selected such that the start character and the end character always map to a predetermined lane.

9. The method of claim 1 wherein the bursts have a fixed burst size except a last burst for each packet which may be different so as to accommodate the packet having a size not equaling an integer multiple of the fixed burst size.

10. The method of claim 1 wherein the bursts all have a fixed burst size with idle words inserted if necessary in a last burst for a given packet.

11. The method of claim 1 further comprising:
  inserting in the payload of some frames a further control word that is distinct from the burst control word;
  wherein each control word including the further control words and the burst control words has an associated type, one of the types being burst control word type.

12. The method of claim 1 wherein the multi-lane serial interface is a XAUI interface.

13. The method of claim 1 wherein the frames are substantially compliant with the XGMII format.

14. The method of claim 1 further comprising:
  receiving meta-frames from a transmitter, the received meta-frames having a size defined by a first dimension by a second dimension, the first dimension being a constant meta-frame length, the second dimension being a number of lanes of the multi-lane serial interface, each frame having a meta-frame separator and a receive payload;
  wherein each receive payload comprises a plurality of bursts, each burst comprising a burst control word and an associated data burst, the burst control word identifying one of a plurality of receive channels to be received on the associated data burst, each data burst comprising a fragment of a packet for the receive channel identified in the associated burst control word;
  transmitting per-receive channel flow control information in respect of the plurality of receive channels.

15. The method of claim 14 further comprising:
  mapping each burst to the multiple lanes in sequence N bytes at a time, where N≧1.

16. The method of claim 15 wherein transmitting per-receive channel flow control information comprises transmitting the per-receive channel flow control information on an additional separate lane or on an additional interface.

17. The method of claim 15 wherein transmitting per-receive channel flow control information comprises transmitting 2 bits of flow control for each of a plurality of channels, with flow control information being included for all channels in one or multiple burst control words.

18. The method of claim 15 wherein transmitting per-receive channel flow control information comprises transmitting a single on/off bit of flow control for each of a plurality of channels.

19. The method of claim 14 further comprising:
mapping each burst to the multiple lanes in sequence N bytes at a time, where N=8.

20. The method of claim 14 further comprising:
performing lane alignment for receive channels by looking for a synchronization word in consistently spaced locations in the received meta-frames.

21. The method of claim 14 further comprising:
performing word synchronization for receive channels by looking for valid data burst/control burst indicator bit combinations in consistently spaced locations.

22. The method of claim 1 further comprising:
mapping each burst to the multiple lanes in sequence N bytes at a time, where N>=1.

23. The method of claim 22 where N=8.

24. The method of claim 23 wherein each set of N=8 bytes are mapped to a 66 bit codeword using a 64b/66b encoder, with two bits indicating each 8 bytes to be either a data burst or a control burst.

25. The method of claim 23 wherein each set of N=8 bytes are mapped to a 67 bit codeword using a 64b/67b encoder, with two bits indicating each 8 bytes to be either a data burst or a control burst, and one bit indicating whether bits of the 64b/67b codeword have been inverted.

26. The method of claim 25 further comprising:
for each lane, maintaining a disparity count reflecting a disparity between how many "1"s have been transmitted vs. how many "0"s have been transmitted;
for a current 64b/67b codeword, inverting bits of the codeword or not as a function of the disparity count.

27. The method of claim 26 wherein inverting comprises inverting all bits of each codeword except the two bits indicating control burst/data burst and the one bit indicating whether bits have been inverted.

28. The method of claim 25 further comprising:
scrambling by XORing 64 bits of each 64b/67b codeword on each meta-frame lane with a current state of a scrambler;
performing scrambler reset and synchronization using a synchronization word in each meta-frame separator.

29. The method of claim 28 further comprising transmitting idle control bursts when there is no data to send.

30. The method of claim 29 further comprising inserting a random channel number into each idle control burst to avoid false synchronization.

31. The method of claim 25 further comprising
performing word synchronization for receive channels by looking for valid three bit patterns for the two bits indicating each 8 bytes to be either a data burst or a control burst and the one bit indicating whether bits of the codeword have been inverted in consistently spaced locations.

32. The method of claim 22 wherein receiving per-transmit channel flow control information comprises receiving per-transmit channel flow control information in each burst control word.

33. The method of claim 22 wherein receiving per-transmit channel flow control information comprises receiving the per-transmit channel flow control information on an additional separate lane or on an additional interface.

34. The method of claim 22 wherein receiving per-transmit channel flow control information comprises receiving 2 bits of flow control for each of a plurality of channels, with flow control information being included for all channels in one or multiple burst control words.

35. The method of claim 34 wherein the 2 bits of flow control information are consistent with SPI4.2 flow control definitions.

36. The method of claim 34 wherein the 2 bits of flow control information are consistent with SPI4.2 flow control definitions with an exception of SATISFIED status which is redefined to indicate that all current credits are cancelled.

37. The method of claim 22 wherein receiving per-transmit channel flow control information comprises receiving a single on/off bit of flow control for each of a plurality of channels.

38. The method of claim 22 further comprising receiving in each burst control word an indication of whether or not to restart flow control at the first channel.

39. The method of claim 22 further comprising including in each burst control word an SOP (start of packet) bit, and EOP (end of packet) bit, and an ERR bit, the SOP and EOP bits indicating whether the following data burst is a start of packet and/or end of packet, and the ERR bit indicating whether there is an error.

40. The method of claim 22 further comprising including in each burst control word an SOP (start of packet) bit, and a four bit EOP_Format field encoded as follows:
'1xxx'—End-of-Packet, with bits xxx defining a number of valid bytes in the last 8-byte word in the burst;
'0000'—no End-of-Packet, no ERR;
'0001'—Error and End-of-Packet;
all other combinations undefined.

41. The method of claim 22 further comprising:
including in each burst control word a CRC over a preceding data burst, and an error correction code over the burst control word.

42. The method of claim 22 further comprising including in each burst control word a CRC over a preceding data burst, and a defined set of bits of the burst control word.

43. The method of claim 22 wherein the meta-frame separator comprises at least two consecutive control words.

44. The method of claim 43 wherein the at least two consecutive control words comprise at least a diagnostic word and an alignment control word.

45. The method of claim 43 wherein the at least two consecutive control words comprise a diagnostic word and an alignment control word, with at least some frames further containing one or more skip control words.

46. The method of claim 22 wherein the bursts have a fixed burst size except a last burst for each packet which may be smaller so as to accommodate the packet having a size not equaling an integer multiple of the fixed burst size.

47. The method of claim 22 wherein fragmenting packets into fragments is done subject to a burst short size and a burst maximum size for data bursts, with idle words being inserted in last burst for a packet if the last fragment does not result in the burst short size.

48. The method of claim 22 wherein fragmenting packets into fragments comprises fragmenting in a manner that avoids bursts being smaller than a burst minimum size without the need to insert idles.

49. The method of claim 48 wherein fragmenting packets into fragments comprises:

fragmenting into fragments equal to a maximum size, and a last fragment containing a remainder;

if the last fragment will be smaller than the burst short size, moving part of a preceding fragment into the last fragment such that they are both larger than the burst minimum size.

50. The method of claim 22 further comprising:

performing the mapping of packets to lanes to fewer lanes in the presence of a lane failure.

* * * * *